US008390943B2

(12) United States Patent
Uemura

(10) Patent No.: US 8,390,943 B2
(45) Date of Patent: Mar. 5, 2013

(54) OPTICAL SYSTEM, AND IMAGING APPARATUS INCORPORATING THE SAME

(75) Inventor: Ryosuke Uemura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/199,987

(22) Filed: Sep. 13, 2011

(65) Prior Publication Data

US 2012/0075729 A1 Mar. 29, 2012

(30) Foreign Application Priority Data

Sep. 24, 2010 (JP) ................................ 2010-213419

(51) Int. Cl.
*G02B 9/12* (2006.01)

(52) U.S. Cl. ........................................ 359/784; 359/791

(58) Field of Classification Search .................. 359/716, 359/753, 784, 791
See application file for complete search history.

(56) References Cited

U.S. PATENT DOCUMENTS 5,627,685 A * 5/1997 Yamanashi ................... 359/745

FOREIGN PATENT DOCUMENTS

| JP | 55-143517 | 11/1980 |
| JP | 2010-061033 | 3/2010 |

* cited by examiner

*Primary Examiner* — William Choi
(74) *Attorney, Agent, or Firm* — Kenyon & Kenyon LLP

(57) ABSTRACT

An imaging optical system has, in order from an object side to an image side, a first lens group, an aperture stop, a second lens group and a third lens group. A first lens, in said third lens group, is movable along an optical axis thereby implementing focusing from a focusing-on-infinity state to a focusing-on-a-near-distance state, with satisfaction of:

$$|f_{(2+3)g}/f_{1g}| < 1 \qquad (1)$$

$$-6.0 < (R_{3gr} + R_{3gf})/(R_{3gr} - R_{3gf}) < 3.5 \qquad (2)$$

where $f_{(2+3)g}$ is the combined focal length of the second lens group and the third lens group upon focusing on infinity; $f_{1g}$ is the focal length of the first lens group; $R_{3gr}$ is the axial radius of curvature of the surface of the most image side of a negative lens component of the third lens group; and $R_{3gf}$ is the axial radius of curvature of the surface of the most object side of said lens component of the third lens group.

5 Claims, 20 Drawing Sheets

Example10

Example 1

(a)

(b)

Example2

(a)

(b)

Example3

Example4

(a)

(b)

Example5

(a)

(b)

Example6

(a)

(b)

Example 7

(a)

(b)

Example8

(a)

(b)

Example9

(a)

(b)

Example10

(a)

(b)

OPTICAL SYSTEM, AND IMAGING APPARATUS INCORPORATING THE SAME

BACKGROUND OF THE INVENTION

In recent years, an optical system whose back focus is extended albeit having a low lenses count has been proposed for an optical system used with single-lens reflex cameras, compact cameras, etc. (for instance, JP(A)'s 2010-61033 and 55-143517).

SUMMARY OF THE INVENTION

According to the present invention, there is an optical system provided, comprising, in order from an object side thereof, a first lens group that remains fixed, an aperture stop, a second lens group that remains fixed and has positive refracting power, and a third lens group that includes a first lens that is a single or cemented lens having negative refracting power, is movable and has negative refracting power, wherein the third lens group moves along an optical axis toward an image side thereby implementing focusing from a focusing-on-infinity state to a focusing-on-a-near-distance state, with satisfaction of the following conditions (1) and (2):

$$|f_{(2+3)g}/f_{1g}| < 1 \quad (1)$$

$$-6.0 < (R_{3gr} + R_{3gf})/(R_{3gr} - R_{3gf}) < 3.5 \quad (2)$$

where $f_{(2+3)g}$ is the combined focal length of the second lens group and the third lens group upon focusing on infinity,
$f_{1g}$ is the focal length of the first lens group,
$R_{3gr}$ is the on-axis radius of curvature of the surface in and on the most image side of a negative lens component forming a part of the third lens group, and
$R_{3gf}$ is the on-axis radius of curvature of the surface in and on the most object side of the lens component forming a part of the third lens group.

The requirements for, and the advantages of, such an arrangement are now explained.

In the optical system here, the first and second lens groups remain fixed, and only the third lens group is movable for focusing. The third lens group has a low lenses count so that weight reduction is easily achievable and, hence, there is a decreased load on drive portions, which allows the optical system to respond smoothly to AF during the taking of moving images.

In that case, the second lens group takes on a substantial refracting power throughout the optical system, and the first lens group takes a substantial role of making sure the angle of view and correction of spherical aberrations and field curvature. The second lens group located after the stop makes an off-axis chief ray substantially parallel with the optical axis thereby letting out an exit pupil position more on the object side, leading to a high telecentric feature. This high telecentric feature helps avoid problems such as shadings. At the same time, it helps hold back height fluctuations of incident rays upon focusing by the third lens group, facilitating holding back fluctuations of various aberrations.

Condition (1) defines the ratio between the focal length of the first lens group and the combined focal length of the second and third lens groups. As described above, it is the second lens group that takes on the substantial refracting power throughout the optical system. In other words, every type from the so-called retrofocus type to the quasi-Gauss type in which a rear group after a stop has a large refracting power falls within the scope of the present invention.

Exceeding the upper limit value of Condition (1) causes the refracting power of the first lens group to grow strong. When the first lens group has positive refracting power, it experiences difficulty achieving size reduction while keeping hold of the telecentric feature, because of the approximation of the optical system to the so-called telephoto type. When the first lens group has negative refracting power, it causes the retrofocus effect to grow strong; so it leaves the back focus longer than necessary, giving rise to a full-length increase.

Condition (2) defines the shape factor, viz., lens shape of the negative lens component in the third lens group. The requirement for the third lens group is that there are reduced fluctuations of various aberrations during focusing. Especially, the amount of spherical aberration fluctuations is greatly affected by that lens shape. At a small angle that the normal to the lens surface forms with an axial marginal ray converging toward the image plane, spherical aberration fluctuations remain reduced. The reason is that light rays are gradually bent, ending up with a decrease in the amount of aberrations produced during lens movement and resulting in spherical aberrations being less thrown off balance.

As the upper limit value of Condition (2) is exceeded, it causes the angle that the normal to the lens surface forms with the axial marginal ray converging toward the image plane to grow large, experiencing difficulty holding back spherical aberration fluctuations during focusing. As the lower limit value of Condition (2) is not reached, there may be less spherical aberration fluctuations, but causes the angle that an off-axis chief ray forms with the normal to the lens surface to grow large, resulting in the inability to hold back meridional field curvature fluctuations in particular.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

While the advantages of the exemplary wide-angle optical system constructions set forth hereinafter are now explained, it is to be understood that the invention is by no means limited to them. The explanation of the exemplary lenses includes a lot of specific details for illustration; however, it would be obvious for those skilled in the art that variations added to those details do not deviate from the scope of the invention. Therefore, the exemplary examples of the invention set forth hereinafter are given without getting rid of the generality of the invention for which rights are sought or imposing any limitation thereon.

The optical system is now explained.

Figure 1:
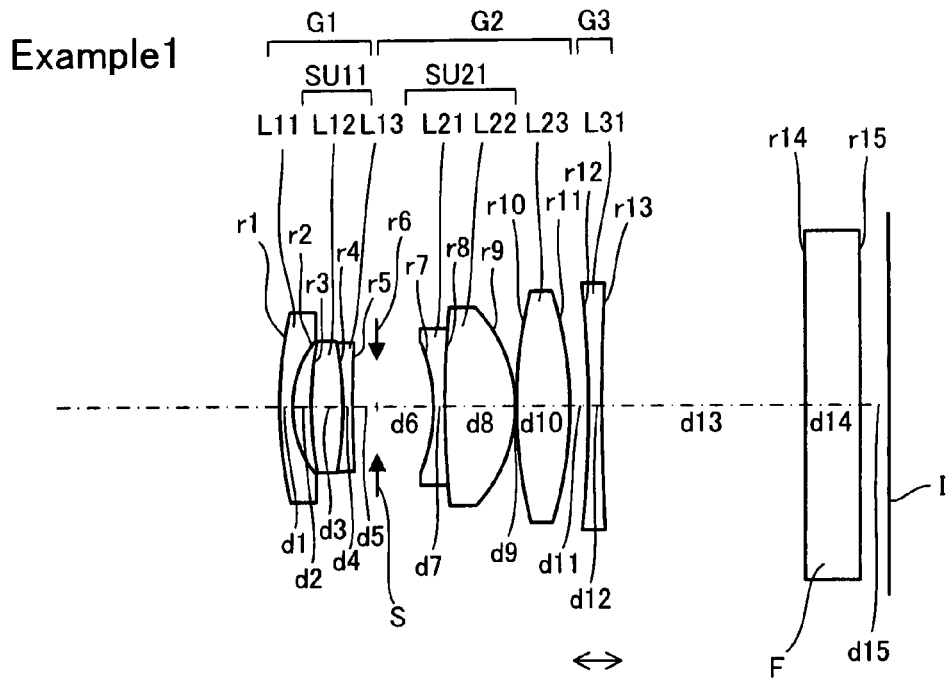
FIG. 1 is a sectional view of the optical system according to Example 1.

FIG. 1 is a sectional view of the optical system according to Example 1.

The optical system here comprises, in order from an object side thereof, a first lens group that remains fixed, an aperture stop, a second lens group that remains fixed and has positive refracting power, and a third lens group that includes a first lens that is one lens having negative refracting power, is movable and has negative refracting power, wherein the third lens group moves along an optical axis toward an image side thereby implementing focusing from a focusing-on-infinity state to a focusing-on-a-near-distance state, with satisfaction of the following conditions (1) and (2):

$$|f_{(2+3)g}/f_{1g}|<1 \quad (1)$$

$$-6.0<(R_{3gr}+R_{3gf})/(R_{3gr}-R_{3gf})<3.5 \quad (2)$$

where $f_{(2+3)g}$ is the combined focal length of the second lens group and the third lens group upon focusing on infinity, $f_{1g}$ is the focal length of the first lens group, $R_{3gr}$ is the axial radius of curvature of the surface in and on the most image side of a negative lens component forming a part of the third lens group, and $R_{3gf}$ is the axial radius of curvature of the surface in and on the most object side of the lens component forming a part of the third lens group.

The requirements for, and the advantages of, such an arrangement are now explained.

In the optical system here, the first and second lens groups remain fixed, and only the third lens group is movable for focusing purposes. The third lens group has a low lenses count so that weight reduction is easily achievable and, hence, there is a decreasing load on drive portions, which allows the optical system to respond smoothly to AF during the taking of moving images.

In that case, the second lens group takes on a substantial refracting power throughout the optical system, and the first lens group takes a substantial role of making sure the angle of view and correction of spherical aberrations and field curvature. The second lens group located after the stop makes an off-axis chief ray substantially parallel with the optical axis thereby letting out an exit pupil position more on the object side, leading to a high telecentric feature. This high telecentric feature helps avoid problems such as shadings. At the same time, it helps hold back height fluctuations of incident rays upon focusing by the third lens group, facilitating holding back fluctuations of various aberrations.

Condition (1) defines the ratio between the focal length of the first lens group and the combined focal length of the second and third lens groups. As described above, it is the second lens group that takes on the substantial refracting power throughout the optical system. In other words, every type from the so-called retrofocus type to the quasi-Gauss type in which a rear group after a stop has a large refracting power falls within the scope of the present invention.

Exceeding the upper limit value of Condition (1) causes the refracting power of the first lens group to grow strong. When the first lens group has positive refracting power, it experiences difficulty achieving size reduction while keeping hold of the telecentric feature, because of the approximation of the optical system to the so-called telephoto type. When the first lens group has negative refracting power, it causes the retrofocus effect to grow strong; so it leaves the back focus longer than necessary, giving rises to a full-length increase.

Condition (2) defines the shape factor, viz., lens shape of the negative lens component in the third lens group. The requirement for the third lens group is that there are reduced fluctuations of various aberrations during focusing. Especially, the amount of spherical aberration fluctuations is greatly affected by that lens shape. At a small angle that the normal to the lens surface forms with an axial marginal ray converging toward the image plane, spherical aberration fluctuations remain reduced. The reason is that light rays are gradually bent, ending up with a decrease in the amount of aberrations produced during lens movement and resulting in spherical aberrations being less thrown off balance.

As the upper limit value of Condition (2) is exceeded, it causes the angle that the normal to the lens surface forms with the axial marginal ray converging toward the image plane to grow large, experiencing difficulty holding back spherical aberration fluctuations during focusing. As the lower limit value of Condition (2) is not reached, there may be less spherical aberration fluctuations, but causes the angle that an off-axis chief ray forms with the normal to the lens surface to grow large, resulting in the inability to hold back meridional field curvature fluctuations in particular.

It is thus possible to provide a rear focus type of compact imaging optical system which is held back in terms of fluctuations of various aberrations, and in which only the lightweight third lens group composed of a fewer lenses is designed as a movable group.

Further for the inventive embodiment here, it is preferable to satisfy one or more of the following requirements or limitations.

For the third lens group it is preferable to satisfy the following Condition (3):

$$-12 < f_{3g}/f < -1.5 \quad (3)$$

where $f_{3g}$ is the focal length of the third lens group, and f is the focal length of the whole optical system upon focusing on infinity.

Condition (3) defines the refracting power ratio of the third lens group with respect to the whole optical system. By the satisfaction of Condition (3) it is possible to hold back fluctuations of various aberrations and reduce the amount of lens movement during focusing. It is consequently possible to stow the optical system well in a compact space.

Exceeding the upper limit value of Condition (3) causes the power of the third lens group to grow strong, resulting in increasing fluctuations of various aberrations during focusing. To make sure the telecentric feature, there must be the power of the second lens group stronger than required, which is not preferable in consideration of influences of decentration, etc. Falling short of the lower limit value of Condition (3) causes the power of the third lens group to decrease and the amount of movement of the third lens group to increase, experiencing difficulty focusing in a compact space.

Figure 2:
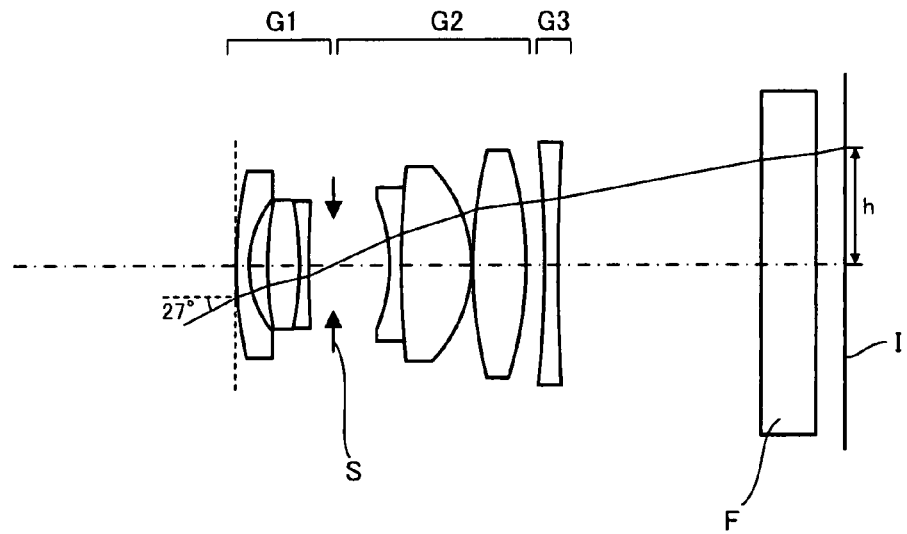
FIG. 2 is illustrative of h as defined by the height on the image plane of the chief ray of incident rays at an angle of 27° with respect to the optical axis (viz. the half angle of view of incidence: 27°).

It is also preferable to satisfy the following Condition (4):

$$-0.1 < -h/\exp < 0.4 \quad (4)$$

where exp is the distance from the exit pupil position to the image plane in an infinite state, provided that the direction from the object plane toward the image plane is taken as positive, and h is defined by the height on the image plane of the chief ray of rays incident at 27° on the optical axis (that is a half angle of view of incidence: 27°), as depicted in FIG. 2.

Condition (4) defines how much an off-axis chief ray is made substantially parallel with the optical axis by the lenses. By the satisfaction of Condition (4), it is possible to space the exit pupil position away from the image plane thereby making sure the telecentric feature and avoiding problems such as shadings. At the same time, it is possible to minimize height fluctuations of incident rays during focusing implemented substantially by the third lens group, with the result that fluctuations of various aberrations can be held back, and influences of decentration, etc. can be minimized as well.

As the upper limit value of Condition (4) is exceeded, it causes oblique incidence to grow tight and influences of rim attenuation to become significant, resulting in difficulty holding back fluctuations of various aberrations. Falling short of the lower limit value of Condition (4) implies that rays are bent by the lenses more than necessary, resulting in an increase in the amount of various aberrations produced at each lens surface, or it implies that a lot more lenses must be used for correction of aberrations, rendering it difficult to achieve compact construction.

The second lens group is characterized by comprising, in order from the object side, the second lens having negative refracting power, the third lens having positive refracting power and a lens component having positive refracting power, with satisfaction of the following Condition (5):

$$|f_{2g}/f_i| < 0.6 \quad (5)$$

where $f_i$ is the combined focal length of the second lens group and the third lens group, and $f_{2g}$ is the focal length of the second lens group.

The second lens group, because of comprising, in order from the object side, the second lens having negative refracting power and the third lens having positive refracting power, contributes mainly to correction of chromatic aberrations and field curvature. The lens component takes on the substantial refracting power prevailing within the second lens group, and plays a main role of making the off-axis chief ray substantially parallel with the optical axis.

Condition (5) defines the ratio of the refracting powers prevailing within the second lens group. Exceeding the upper limit value of Condition (5) causes the combined power of the second and third lenses to be in excess. Indeed, it may be preferable to enhance the telecentric feature by the lens component located after the third lens. In the embodiment here, however, it is the second and third lenses that take a role of enhancing the telecentric feature. This is not preferable in view of making sure performance, because correction of various aberrations in general and chromatic aberrations in particular are thrown off balance.

Preferably for the second lens group, the second and third lenses are cemented together. Because there is a stop located on the object side of the second lens group, axial marginal rays grow high. Here if the second and third lenses in the second lens group positioned on the image side of the stop are cemented together, it is then easy to correct chromatic aberrations, inter alia, longitudinal chromatic aberration by that cemented lens.

Further, it is preferable to satisfy the following Condition (6):

$$0.005 < D_{2g-3g}/TL < 0.2 \quad (6)$$

where $d_{2g-3g}$ is the axial separation, upon focusing on infinity, between the surface in and on the most image side of the second lens group and the surface in and on the most object side of the third lens group, and TL is the full length of the optical system.

Condition (6) defines the separation between the second lens group and the third lens group. An excessively wide separation is not preferable in terms of just only weight but also size, partly because it is difficult to make sure the sufficient amount of focusing movement, and partly because the focusing group grows diametrically large. In view of prevention of inter-lens interferences during focusing and absorption of image plane shifting due to production errors or the like by the movement of the focusing group, on the other hand, it is preferable to provide a practically certain separation between both lens groups.

Exceeding the upper limit to Condition (6) is not preferable because it is difficult to take hold of the sufficient amount of focusing movement, and falling short of the lower limit to Condition (6) is again not preferable because inter-lens interference during focusing, etc. arise a problem.

In the embodiment here, negative distortion apt to occur in the case of the retrofocus type having a large-power positive group after a stop is not intentionally corrected: it more or less remains produced, because of working in favor of making the whole optical system compact. If an image is taken by a solid-state imaging device and image distortion is corrected by applying image processing to the ensuing data, it is then possible to obtain image data almost similar in shape to the object.

More preferably, one or more of Conditions (1) to (6) should be replaced by one or more of corresponding, more narrowed-down Conditions (1') to (6').

$$|f_{(2+3)g}/f_{1g}| < 0.7 \quad (1')$$

$$-4 < (R_{3gr} + R_{3gf})/(R_{3gr} - R_{3gf}) < 2 \quad (2')$$

$$-10 < f_{3g}/f < -2 \quad (3')$$

$$0.1 < -h/\exp < 0.35 \quad (4')$$

$$-0.2 < f_{2g}/f_i < 0.5 \quad (5')$$

$$0.01 < d_{2g-3g}/TL < 0.1 \quad (6')$$

More preferably, one or more of Conditions (1) to (6) should be replaced by one or more of corresponding, even more narrowed-down Conditions (1") to (6").

$$|f_{(2+3)g}/f_{1g}| < 0.55 \quad (1'')$$

$$-1 < (R_{3gr} + R_{3gf})/(R_{3gr} - R_{3gf}) < 2 \quad (2'')$$

$$-10 < f_{3g}/f < -2.5 \quad (3'')$$

$$0.12 < -h/\exp < 0.3 \quad (4'')$$

$$-0.1 < f_{2g}/f_i < 0.4 \quad (5'')$$

$$\mathbf{0.02} < d_{2g-3g}/TL < 0.06 \quad (6'')$$

Only the upper or lower limit value of each condition may be defined as a new upper or lower limit value.

The optical systems of Examples 1 to 10 are now explained.

FIG. 1 is a sectional view of the optical system of Example 1.

As shown in FIG. 1, the optical system of Example 1 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from the object side, a cemented lens SU21 of a double-concave negative lens L21 and a double-convex positive lens L22, and a double-convex positive lens L23.

The third lens group G3 is made up of one double-concave negative lens L31.

F and I stand for a filter and an image plane, respectively.

Four aspheric surfaces are applied: two to both surfaces of the negative meniscus lens L11 in the first lens group G1 and two to both surfaces of the image-side double-convex positive lens L23 in the second lens group G2.

Figure 3:
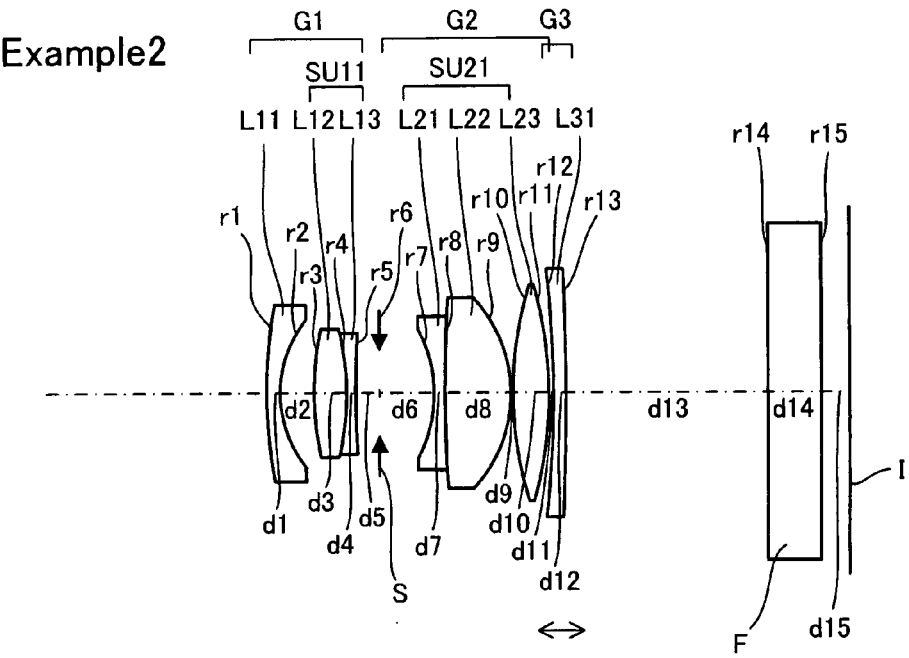
FIG. 3 is a sectional view of the optical system according to Example 2.

FIG. 3 is a sectional view of the optical system of Example 2.

As shown in FIG. 3, the optical system of Example 2 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from the object side, a second doublet lens SU21 of a double-concave negative lens L21 and a double-convex positive lens L22, and a double-convex positive lens L23.

The third lens group G3 is made up of one negative meniscus lens L31 convex on its image side.

F and I stand for a filter and an image plane, respectively.

Two aspheric surfaces are applied to both surfaces of the image-side double-convex positive lens L23 in the second lens group G2.

Figure 4:
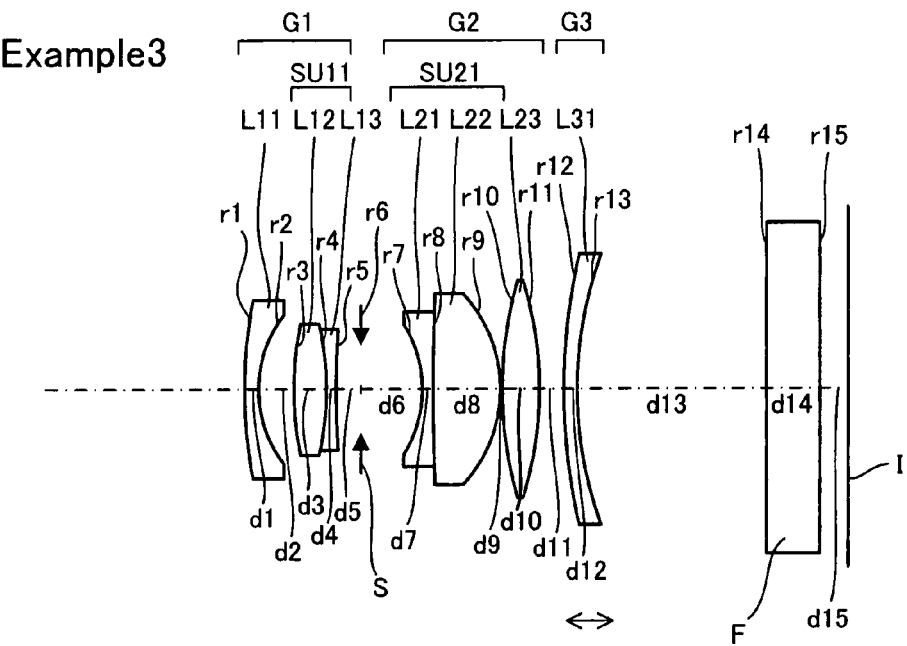
FIG. 4 is a sectional view of the optical system according to Example 3.

FIG. 4 is a sectional view of the optical system of Example 3.

As shown in FIG. 4, the optical system of Example 3 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of, a negative meniscus lens L11 convex on its object side, and a cemented lens SU11 of a double-convex positive lens L12 and a double-concave negative lens L13.

The second lens group G2 is made up of, in order from the object side, a cemented lens SU21 of a double-concave negative lens L21 and a double-convex positive lens L22, and a double-convex positive lens L23.

The third lens group G3 is made up of one negative meniscus lens L31 convex on its object side.

F and I stand for a filter and an image plane, respectively.

Two aspheric surfaces are applied to both surfaces of the image-side double-convex positive lens L23 in the second lens group G2.

Figure 5:
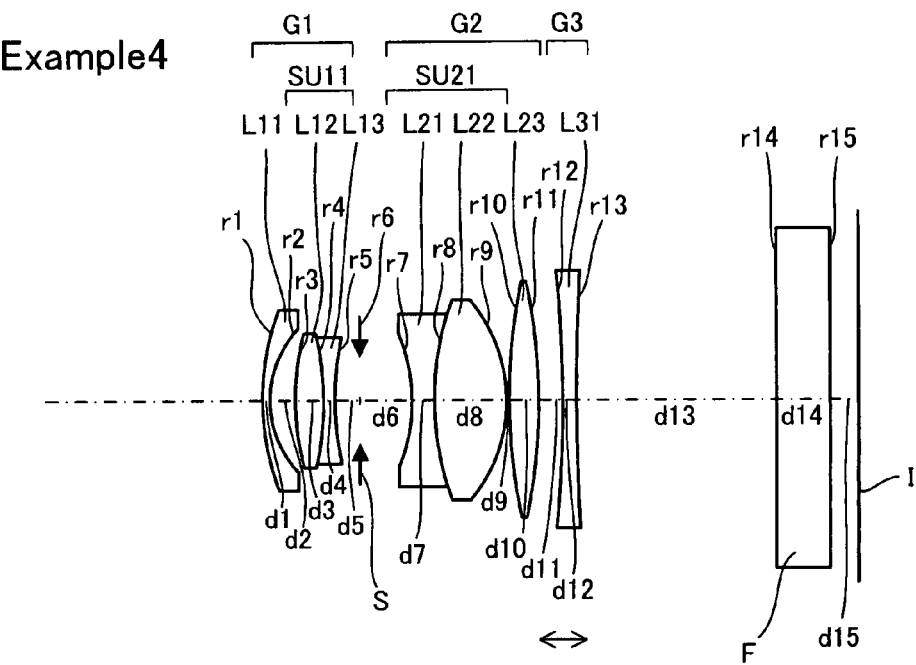
FIG. 5 is a sectional view of the optical system according to Example 4.

FIG. 5 is a sectional view of the optical system of Example 4.

As shown in FIG. 5, the optical system of Example 4 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from the object side, a cemented lens SU21 of a double-concave negative lens L21 and a double-convex positive lens L22, and a double-convex positive lens L23.

The third lens group G3 is made up of one double-concave negative lens L31.

F and I stand for a filter and an image plane, respectively.

Four aspheric surfaces are applied: two to both surfaces of the image-side double-convex positive lens L23 in the second lens group G2 and two to both surfaces of the double-concave negative lens L31 forming the third lens group G3.

Figure 6:
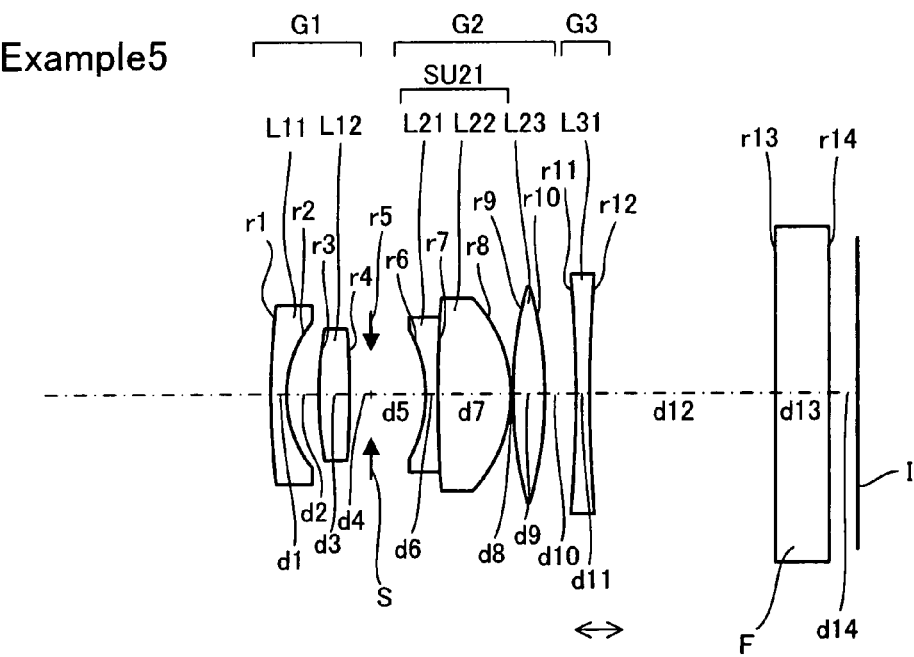
FIG. 6 is a sectional view of the optical system according to Example 5.

FIG. 6 is a sectional view of the optical system of Example 5.

As shown in FIG. 6, the optical system of Example 5 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side and a double-convex positive lens L12.

The second lens group G2 is made up of, in order from the object side, a cemented lens SU21 of a double-concave negative lens L21 and a double-convex positive lens L22, and a double-convex positive lens L23.

The third lens group G3 is made up of one double-concave negative lens L31.

F and I stand for a filter and an image plane, respectively.

Two aspheric surfaces are applied to both surfaces of the image-side double-convex positive lens L23 in the second lens group G2.

Figure 7:
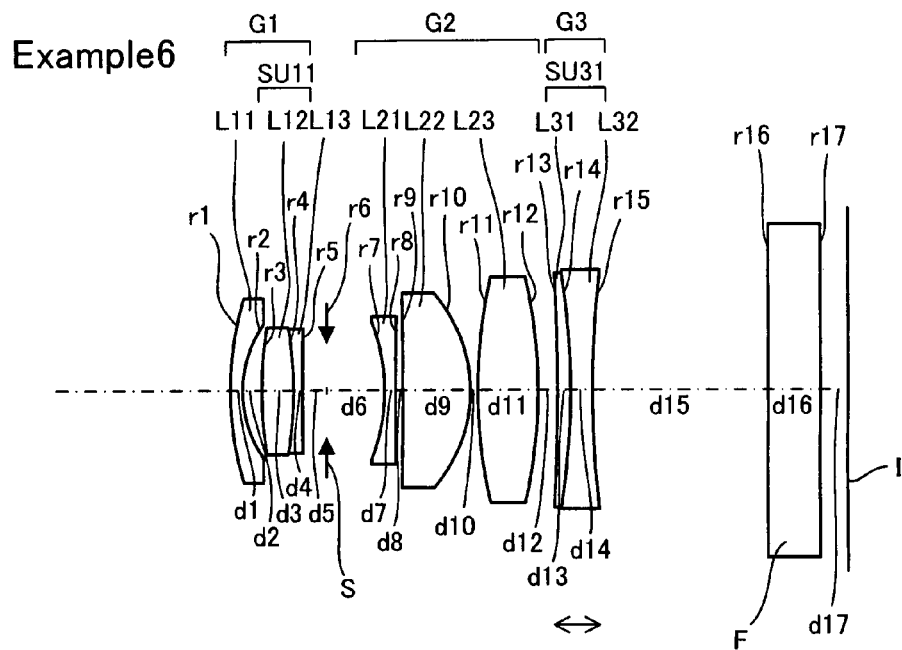
FIG. 7 is a sectional view of the optical system according to Example 6.

FIG. 7 is a sectional view of the optical system of Example 6.

As shown in FIG. 7, the optical system of Example 6 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from the object side, a double-concave negative lens L21, a positive meniscus lens L22 convex on its image side and a double-convex positive lens L23.

The third lens group G3 is made up of a cemented lens SU31 of a positive meniscus lens L31 convex on its image side and a double-concave negative lens L32.

F and I stand for a filter and an image plane, respectively.

Four aspheric surfaces are applied: two to both surfaces of the negative meniscus lens L11 in the first lens group G1 and two to both surfaces of the image-side double-convex positive lens L23 in the second lens group G2.

Figure 8:
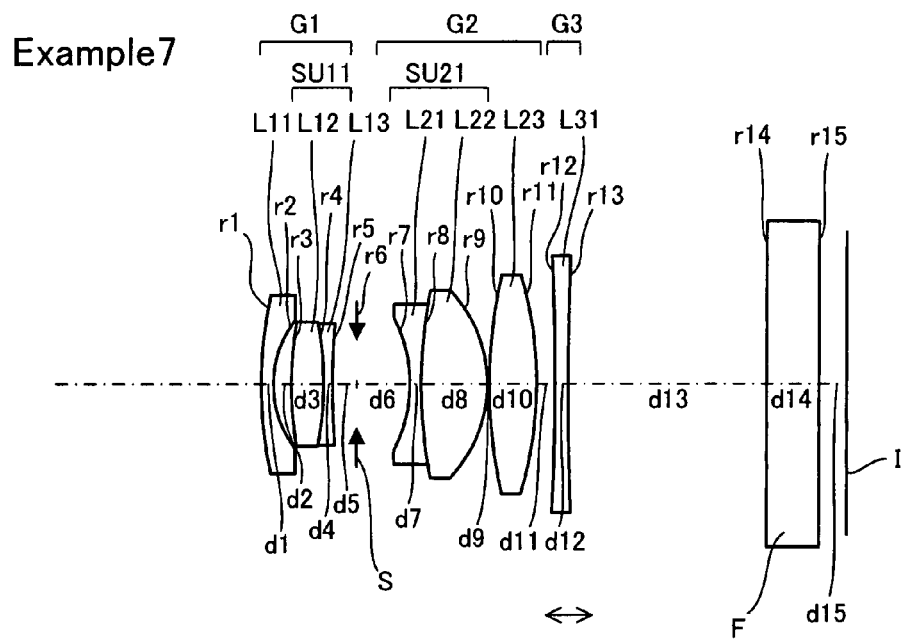
FIG. 8 is a sectional view of the optical system according to Example 7.

FIG. 8 is a sectional view of the optical system of Example 7.

As shown in FIG. 8, the optical system of Example 7 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from object side, a cemented lens SU21 of a double-concave negative lens L21 and a double-convex positive lens L22, and a double-convex positive lens L23.

The third lens group G3 is made up of one double-concave negative lens L31.

F and I stand for a filter and an image plane, respectively.

Four aspheric surfaces are applied: two to both surfaces of the negative meniscus lens L11 in the first lens group G1 and two to both surfaces of the image-side double-convex positive L23 in the second lens group G2.

Figure 9:
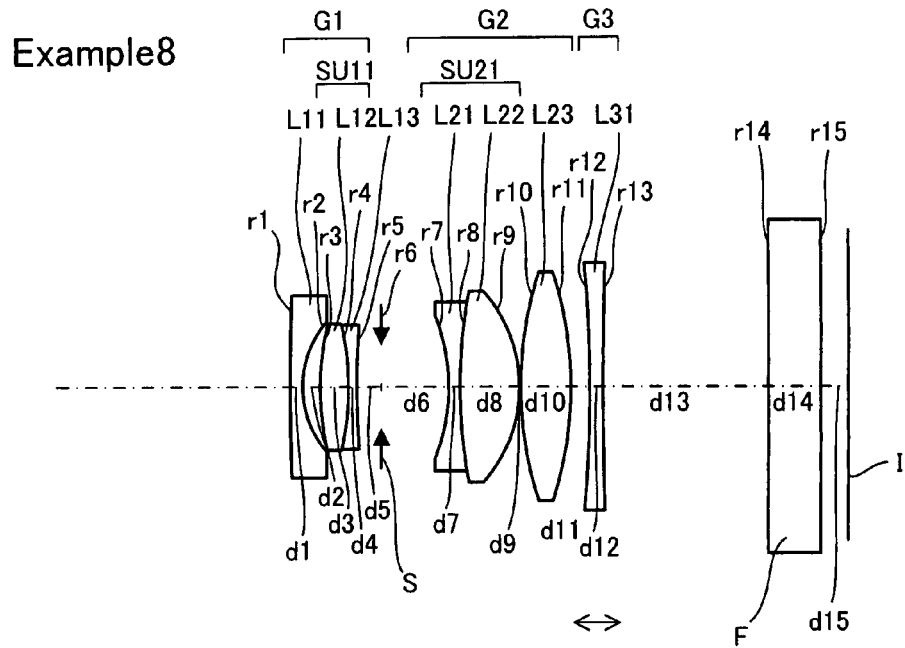
FIG. 9 is a sectional view of the optical system according to Example 8.

FIG. 9 is a sectional view of the optical system of Example 8.

As shown in FIG. 9, the optical system of Example 8 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a negative meniscus lens L11 convex on its object side, and a cemented lens SU11 of a double-convex positive lens L12 and a double-concave negative lens L13.

The second lens group G2 is made up of, in order from the object side, a cemented lens SU21 of a double-concave negative lens L21 and a double-convex positive lens L22, and a double-convex positive lens L23.

The third lens group G3 is made up of one double-concave negative lens L31.

F and I stand for a filter and an image plane, respectively.

Four aspheric surfaces are applied: two to both surfaces of the negative meniscus lens L11 in the first lens group G1 and two to both surfaces of the image-side double-convex positive lens L23 in the second lens group G2.

Figure 10:
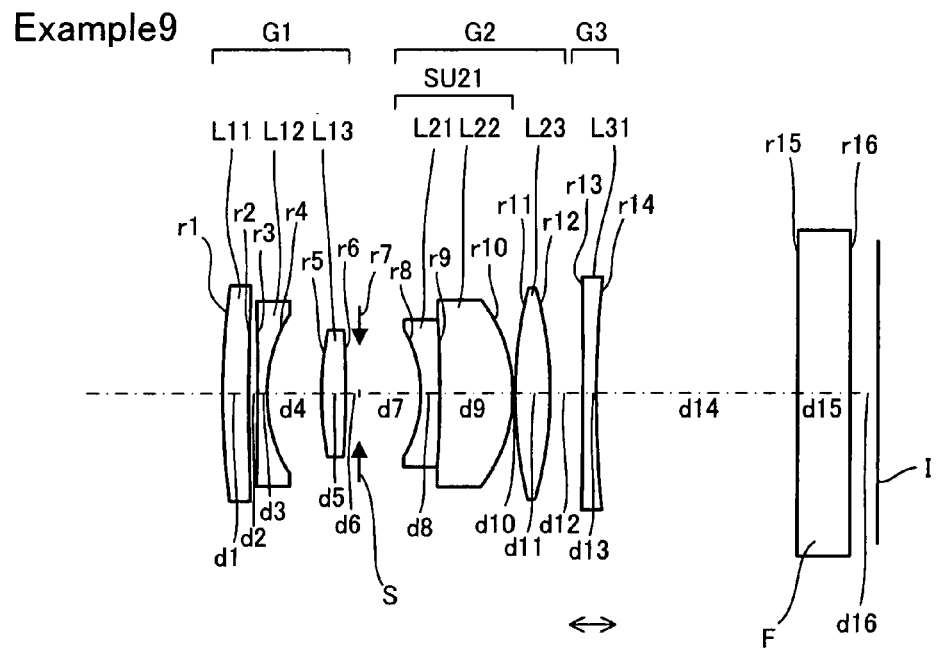
FIG. 10 is a sectional view of the optical system according to Example 9.

FIG. 10 is a sectional view of the optical system of Example 9.

As shown in FIG. 10, the optical system of Example 9 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a positive meniscus lens L11 convex on its object side, a double-concave negative lens L12 and a double-convex positive lens L13.

The second lens group is made up of, in order from the object side, a cemented lens SU21 of a negative meniscus lens L21 convex on its image side and a positive meniscus lens L22 convex on its image side, and a double-convex positive lens L23.

The third lens group G3 is made up of one double-concave negative lens L31.

F and I stand for a filter and an image plane, respectively.

Three aspheric surfaces are applied: one to the object-side surface of the negative meniscus lens L11 in the first lens group G1 and two to both surfaces of the double-convex positive lens L23 in the second lens group G2.

Figure 11:
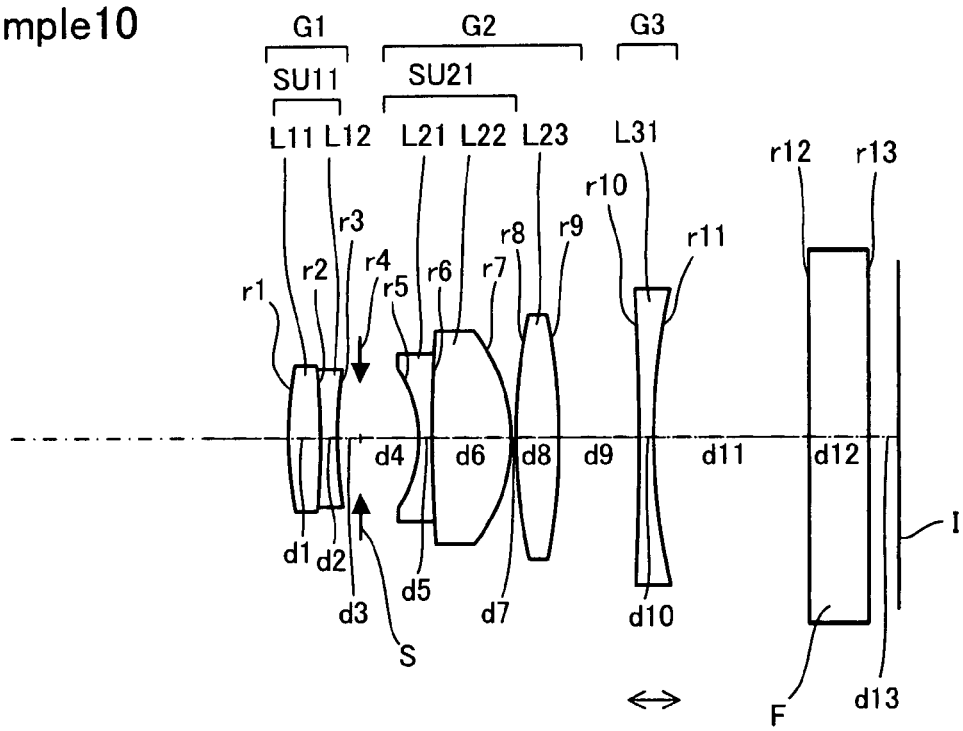
FIG. 11 is a sectional view of the optical system according to Example 10.
Figure 12:
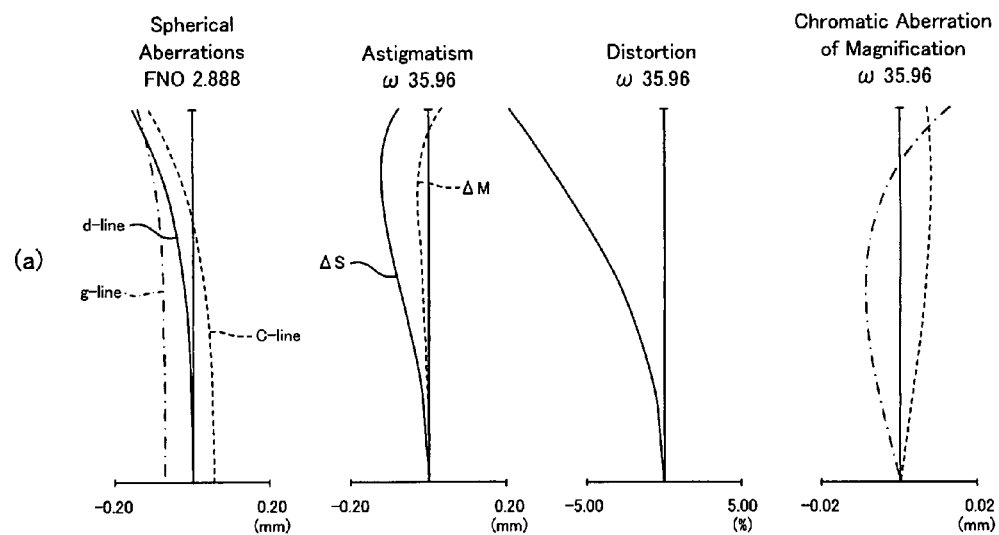
FIG. 12 is a set of diagrams for various aberrations of the optical system according to Example 1 in a focusing-on-infinity state and a close-range-focusing state (an object distance: 200 mm).
Figure 12:
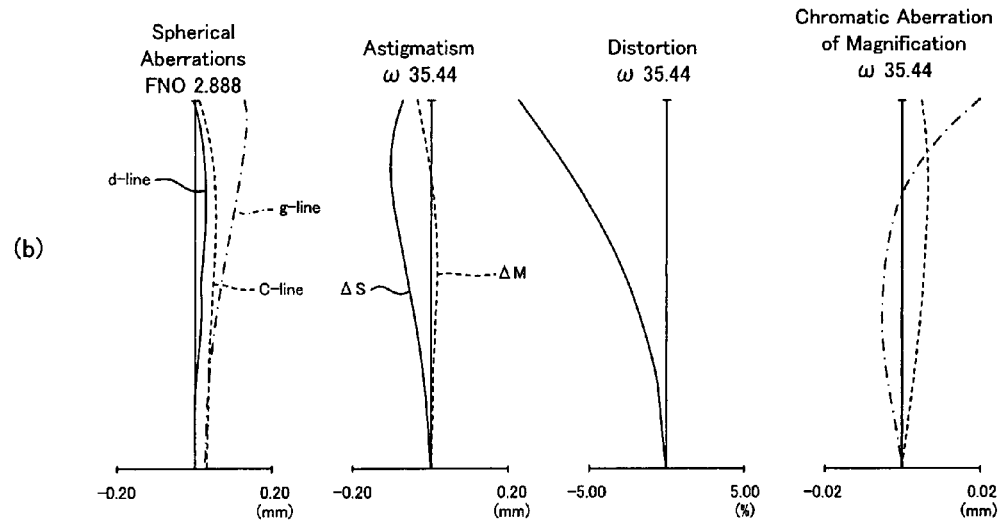
Figure 13:
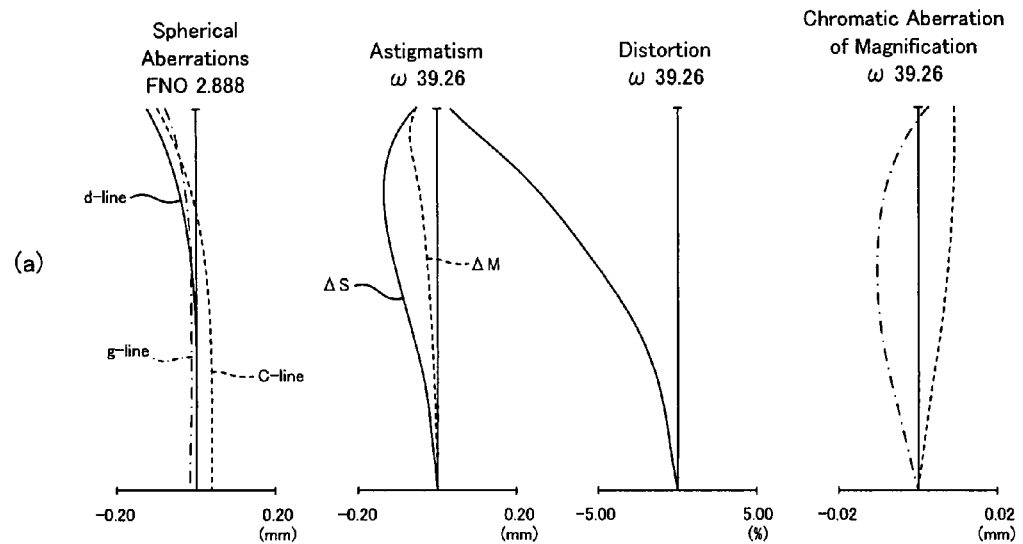
FIG. 13 is a set of diagrams for various aberrations of the optical system according to Example 2 in a focusing-on-infinity state and a close-range-focusing state (an object distance: 200 mm).
Figure 13:
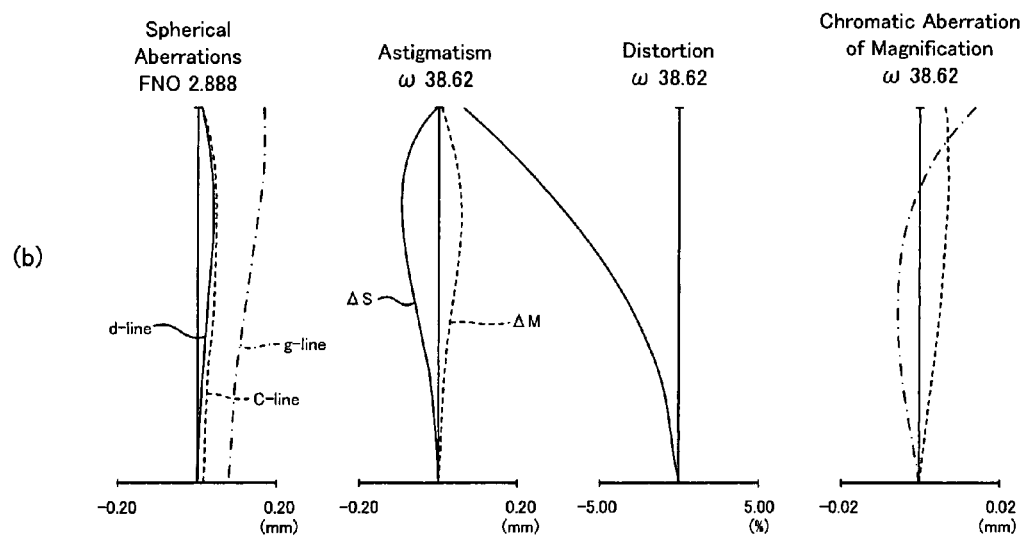
Figure 14:
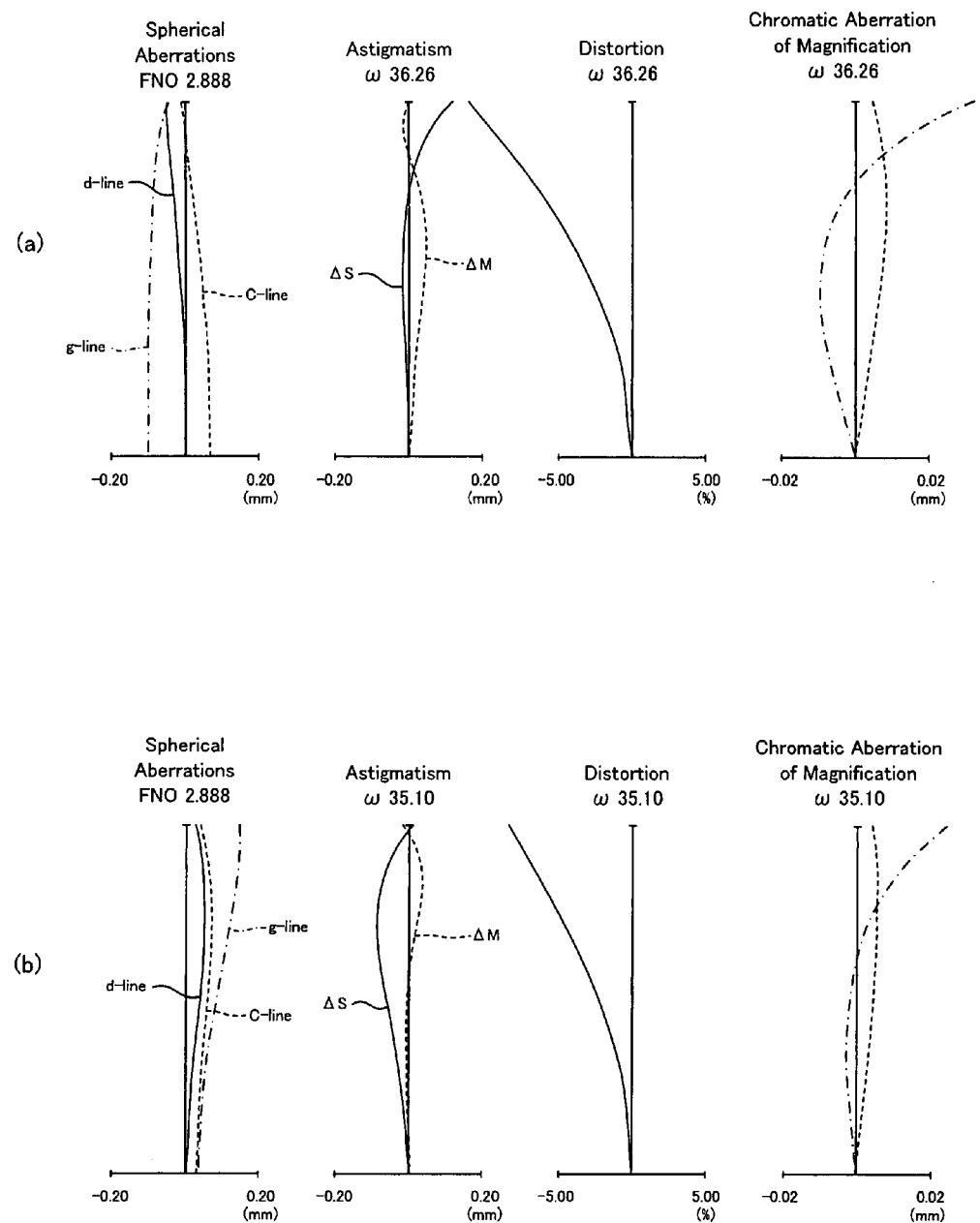
FIG. 14 is a set of diagrams for various aberrations of the optical system according to Example 3 in a focusing-on-infinity state and a close-range-focusing state (an object distance: 200 mm).
Figure 15:
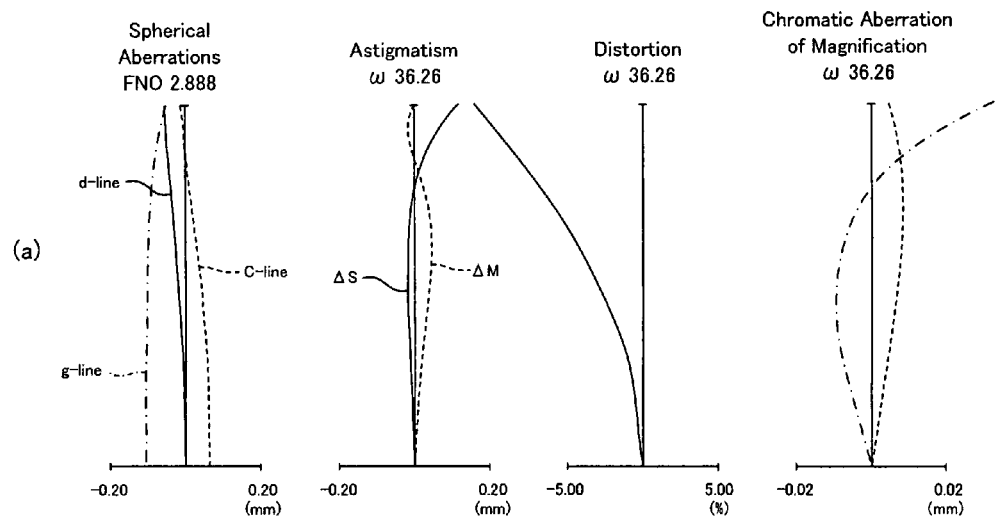
FIG. 15 is a set of diagrams for various aberrations of the optical system according to Example 4 in a focusing-on-infinity state and a close-range-focusing state (an object distance: 200 mm).
Figure 15:
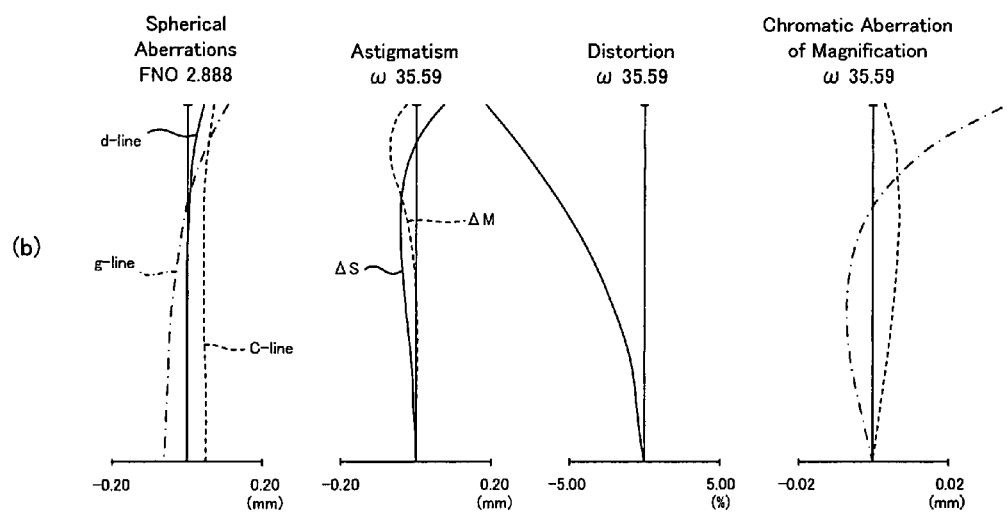
Figure 16:
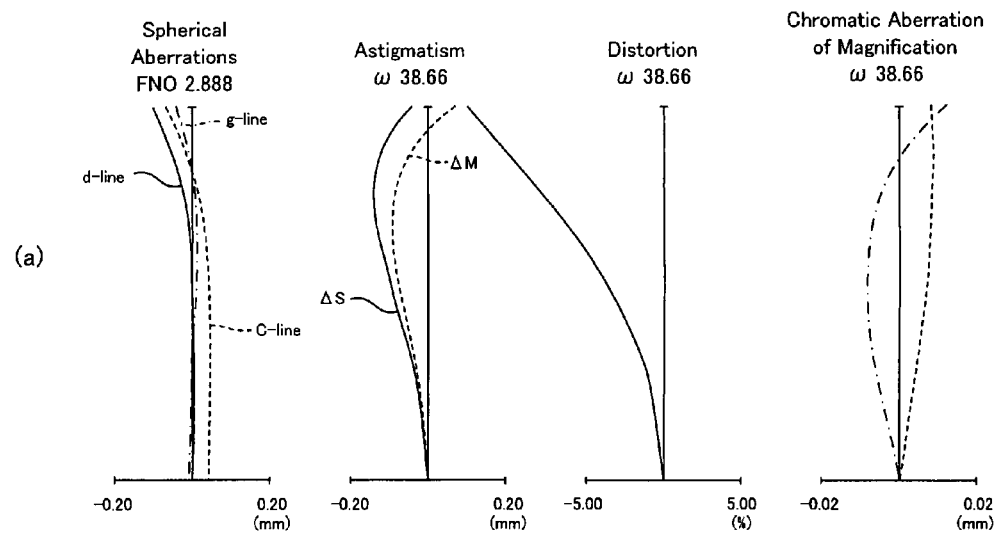
FIG. 16 is a set of diagrams for various aberrations of the optical system according to Example 5 in a focusing-on-infinity state and a focusing-on-a-near distance state (an object distance: 200 mm).
Figure 16:
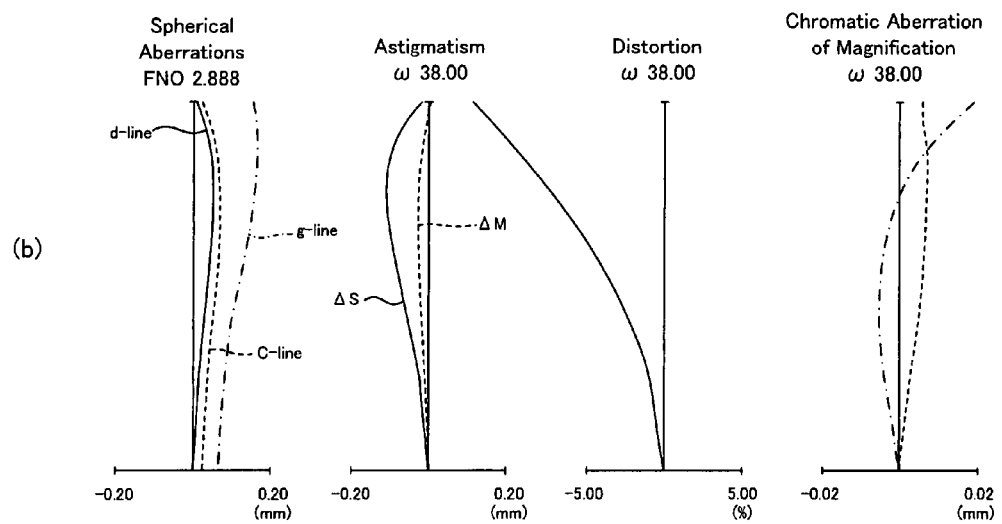
Figure 17:
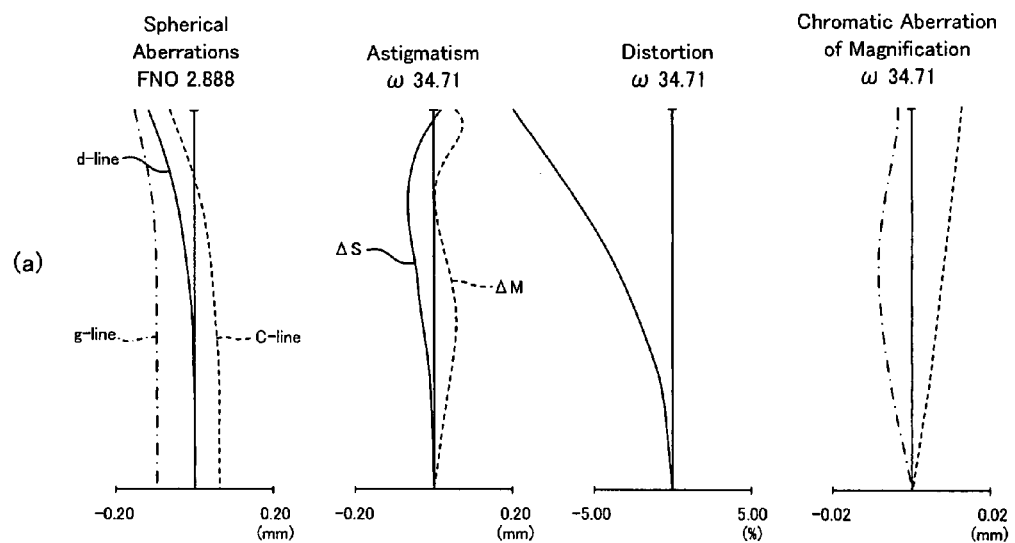
FIG. 17 is a set of diagrams for various aberrations of the optical system according to Example 6 in a focusing-on-infinity state and a close-range-focusing state (an object distance: 200 mm).
Figure 17:
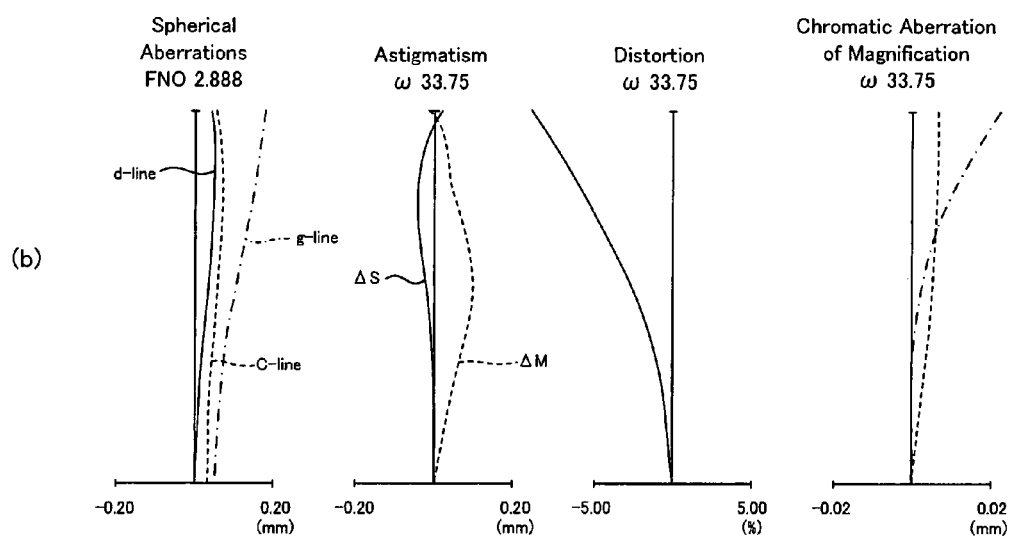
Figure 18:
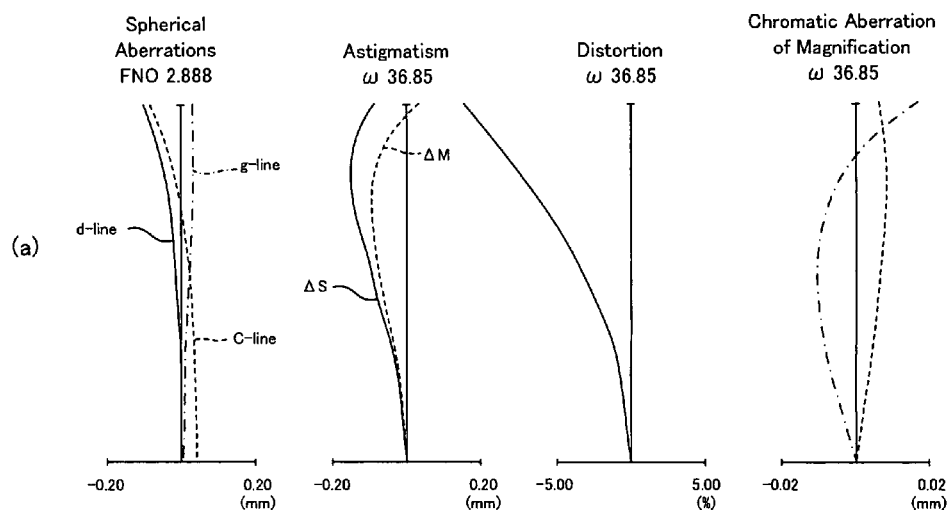
FIG. 18 is a set of diagrams for various aberrations of the optical system according to Example 7 in a focusing-on-infinity state and a close-range-focusing state (an object distance: 200 mm).
Figure 18:
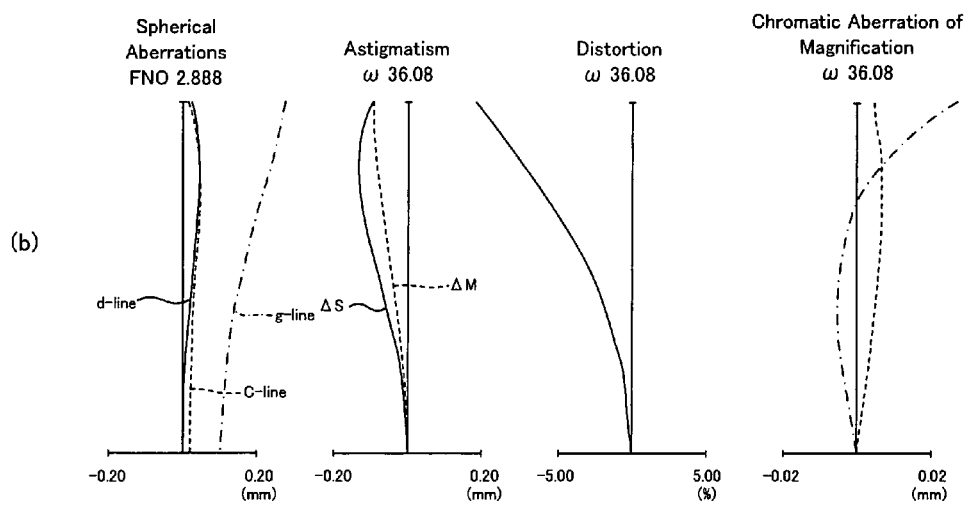
Figure 19:
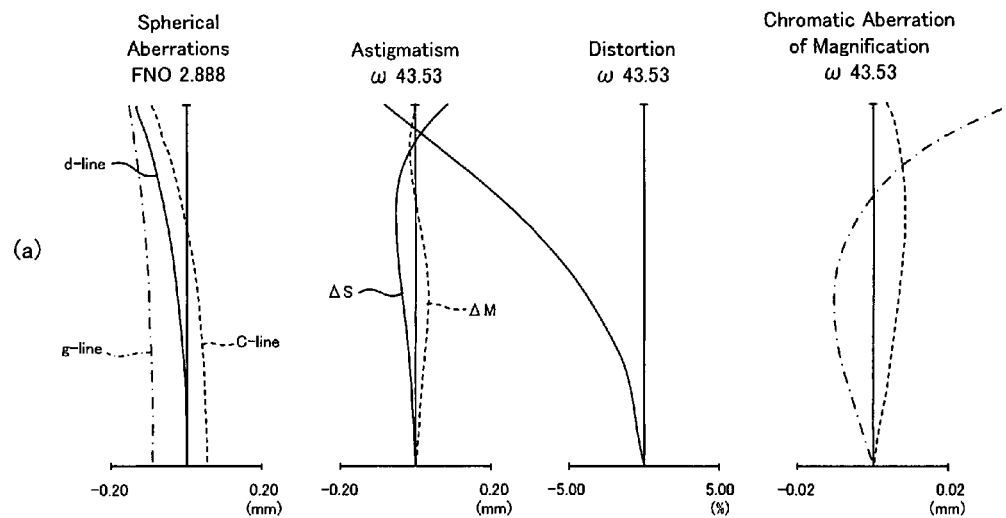
FIG. 19 is a set of diagrams for various aberrations of the optical system according to Example 8 in a focusing-on-infinity state and a close-range-focusing state (an object distance: 200 mm).
Figure 19:
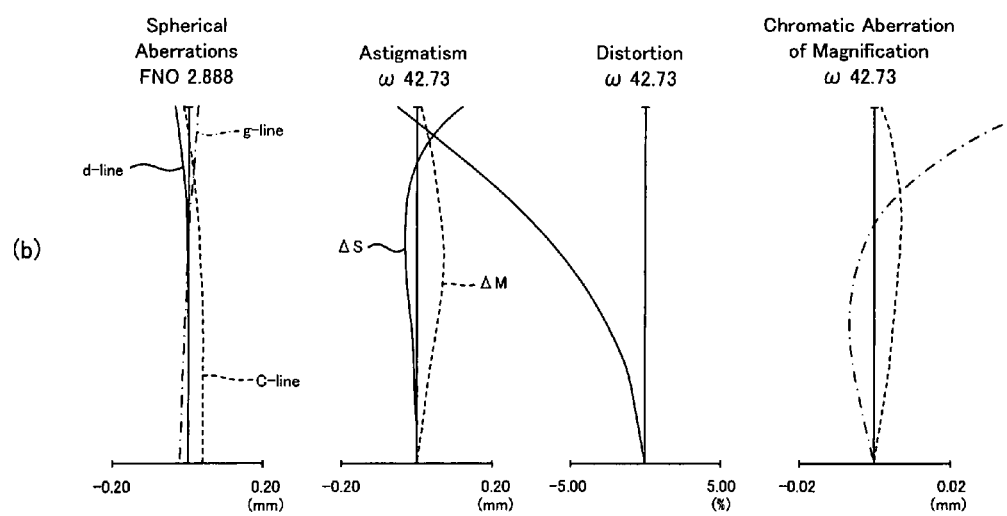
Figure 20:
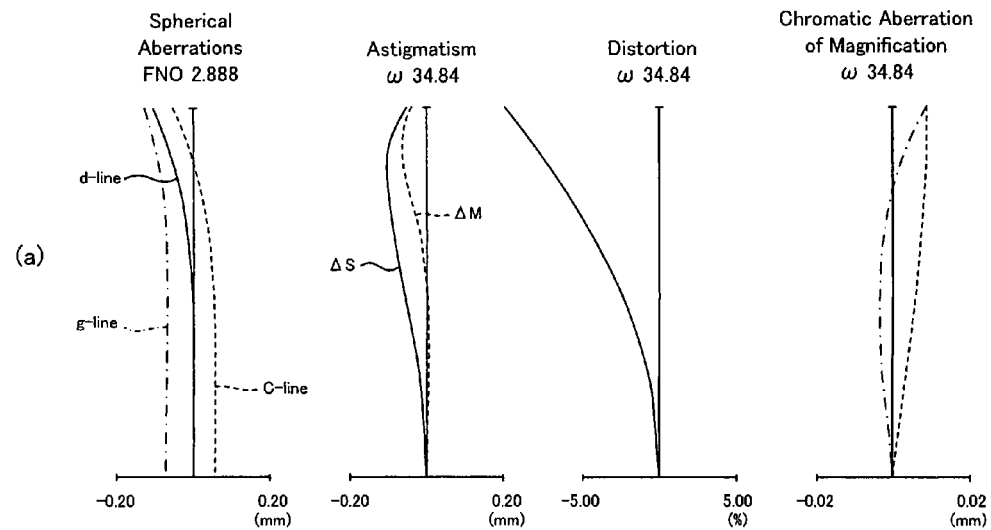
FIG. 20 is a set of diagrams for various aberrations of the optical system according to Example 9 in a focusing-on-infinity state and a close-range-focusing state (an object distance: 200 mm).
Figure 20:
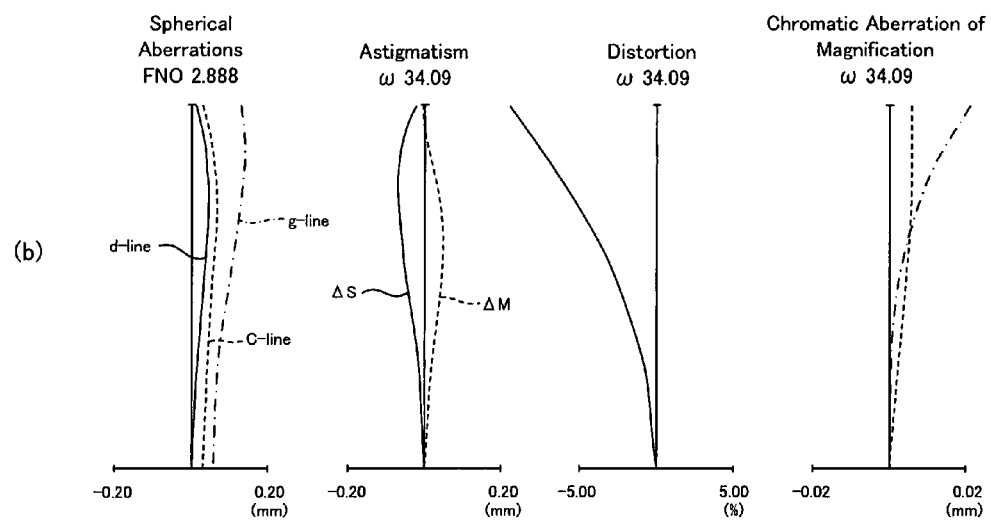
Figure 21:
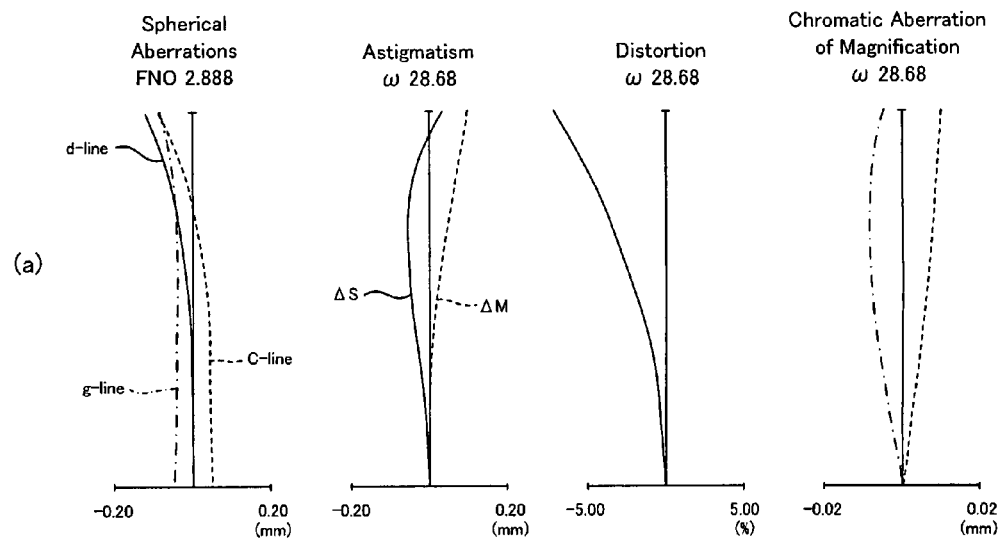
FIG. 21 is a set of diagrams for various aberrations of the optical system according to Example 10 in a focusing-on-infinity state and a close-range-focusing state (an object distance: 200 mm).
Figure 21:
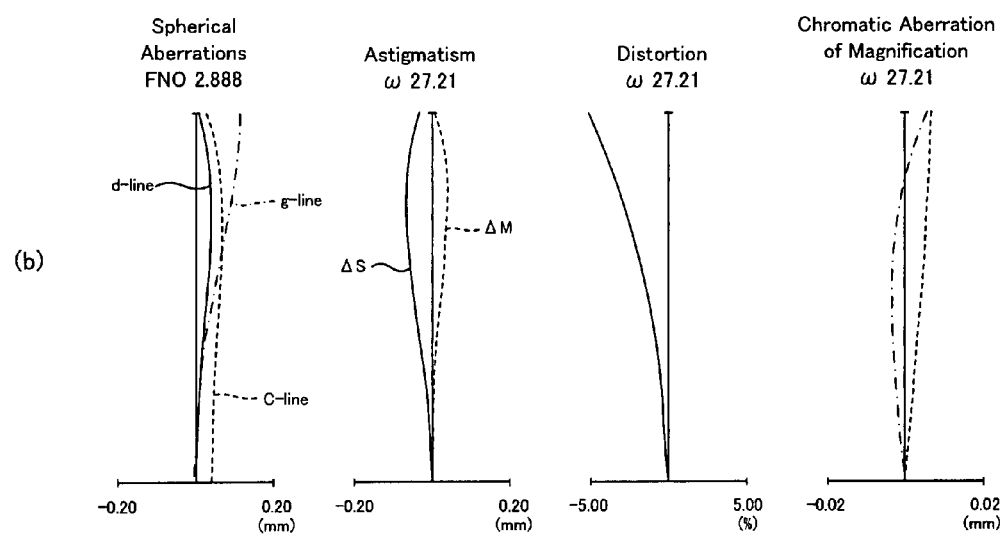

FIG. 11 is a sectional view of the optical system of Example 10.

As shown in FIG. 11, the optical system of Example 10 is built up of, in order from the object side, a first lens group G1 that remains fixed, an aperture stop S, a second lens group G2 that remains fixed and has positive refracting power, and a third lens group G3 that includes one negative lens, is movable and has negative refracting power.

The first lens group G1 is made up of a cemented lens SU11 of a double-convex positive lens L11 and a double-concave negative lens L12.

The second lens group G2 is made up of, in order from the object side, a cemented lens SU21 of a double-concave negative lens L21 and a double-convex positive lens L22, and a double-convex positive lens L24.

The third lens group G3 is made up of one double-concave negative lens L31.

F and I stand for a filter and an image plane, respectively.

Two aspheric surfaces are applied to both surfaces of the image-side double-convex positive lens L23 in the second lens group G2.

Tabulated below are numeral data about Examples 1-10. In the numeral data about Examples 1 to 10, r is the radius of curvature of the lens surface; d is the lens thickness or air separation; Nd and νd are the d-line (λ=587.6 nm) refractive index and Abbe constant, respectively; f is the focal length of the whole optical system in the focusing-on-infinity state; Fno is the F-number; and ω is the half angle of view (°).

In the specifications tables about the examples, the surface to which (aspheric) is affixed is a surface of aspheric shape. Here let H be the height vertical to the optical axis, X(H) be the amount of axial displacement at the height H with the surface vertex as the origin, r be the paraxial radius of curvature, K be the conic coefficient, and A4, A6, A8 and A10 be the $4^{th}$-order, $6^{th}$-order, $8^{th}$-order and $10^{th}$-order aspheric coefficients. The aspheric shape is given by the following formula (a):

$$X(H)=(H^2/r)/\{1+[1-(1+K)\cdot(H^2/r^2)]^{1/2}\}+A4H^4+A6H^6+A8H^8+A10H^{10} \quad (a)$$

Note here that E stands for a power of 10; for instance, "E-10" represents a −10 power of 10.

Numeral Example 1

| | Unit mm | | | |
|---|---|---|---|---|
| | Surface Data | | | |
| Surface No. | r | d | nd | νd |
| 1 (Aspheric Surface) | 29.202 | 0.95 | 1.53071 | 55.67 |
| 2 (Aspheric Surface) | 7.525 | 1.38 | | |
| 3 | 26.121 | 2.34 | 1.83400 | 37.16 |
| 4 | −23.499 | 0.69 | 1.48749 | 70.23 |
| 5 | 92.385 | 1.82 | | |
| 6 (Stop) | ∞ | 4.13 | | |
| 7 | −11.943 | 0.85 | 1.75211 | 25.05 |
| 8 | 67.908 | 5.14 | 1.74100 | 52.64 |
| 9 | −10.224 | 0.12 | | |
| 10 (Aspheric Surface) | 29.259 | 3.85 | 1.53071 | 55.67 |
| 11 (Aspheric Surface) | −26.799 | D11 | | |
| 12 | −87.241 | 1.00 | 1.74077 | 27.79 |
| 13 | 150.774 | D13 | | |
| 14 | ∞ | 4.05 | 1.51633 | 64.14 |
| 15 | ∞ | 2.07 | | |
| Image Plane | ∞ | | | |

Aspheric Data

1st Surface

K = 0.012, A4 = −1.72584E−09, A6 = 1.61391E−07,
A8 = −6.62397E−09
2nd Surface

K = 0.002, A4 = −1.70425E−09, A6 = 1.61644E−06,
A8 = −9.27089E−08

10th Surface

K = −0.010, A4 = −3.46439E−05, A6 = 2.96282E−08,
A8 = −9.18617E−14
11th Surface

K = −0.015, A4 = 1.40993E−05, A6 = −7.71734E−08,
A8 = 9.43176E−10

Focusing Data

| | Upon Focusing on Infinity | Upon Close-Range Focusing (Object Distance: 200 mm) |
|---|---|---|
| D11 | 1.405 | 4.750 |
| D13 | 14.95 | 11.61 |

Data Set

| | Upon Focusing on Infinity |
|---|---|
| f | 17.34 |
| Fno | 2.89 |
| Angle of View (2ω) | 70.87° |
| Image Height | 11.15 |
| $BF_{inair}$ | 19.69 |
| Full Lens Length | 43.37 |

Numeral Example 2

| | Unit mm | | | |
|---|---|---|---|---|
| | Surface Data | | | |
| Surface No. | r | d | nd | νd |
| 1 | 37.763 | 1.00 | 1.48749 | 70.23 |
| 2 | 8.553 | 2.61 | | |
| 3 | 22.373 | 2.46 | 1.83400 | 37.16 |
| 4 | −21.797 | 0.69 | 1.56732 | 42.82 |
| 5 | 54.431 | 1.84 | | |
| 6 (Stop) | ∞ | 4.17 | | |
| 7 | −9.862 | 0.80 | 1.75211 | 25.05 |
| 8 | 102.176 | 5.01 | 1.72916 | 54.68 |
| 9 | −10.386 | 0.13 | | |
| 10 (Aspheric Surface) | 22.942 | 2.80 | 1.53071 | 55.67 |
| 11 (Aspheric Surface) | −27.438 | D11 | | |
| 12 | −84.633 | 1.00 | 1.84666 | 23.78 |
| 13 | −228.457 | D13 | | |
| 14 | ∞ | 4.05 | 1.51633 | 64.14 |
| 15 | ∞ | 2.10 | | |
| Image Plane | ∞ | | | |

Aspheric Data

10th Surface

K = −0.099, A4 = −4.14490E−05, A6 = 1.50625E−07,
A8 = −6.63952E−10
11th Surface

K = 0.004, A4 = 1.58636E−05, A6 = 1.46862E−08

Focusing Data

| | Upon Focusing on Infinity | Upon Close-Range Focusing (Object Distance: 200 mm) |
|---|---|---|
| D11 | 0.31 | 7.13 |
| D13 | 15.50 | 8.68 |

-continued

Unit mm

Data Set

Upon Focusing on Infinity

| | |
|---|---|
| f | 16.16 |
| Fno | 2.89 |
| Angle of View(2ω) | 77.24° |
| Image Height | 11.15 |
| $BF_{inair}$ | 20.26 |
| Full Lens Length | 43.08 |

Numeral Example 3

Unit mm

Surface Data

| Surface No. | r | d | nd | νd |
|---|---|---|---|---|
| 1 | 34.037 | 1.14 | 1.48749 | 70.23 |
| 2 | 9.032 | 2.58 | | |
| 3 | 22.452 | 2.47 | 1.83400 | 37.16 |
| 4 | −21.023 | 0.71 | 1.56732 | 42.82 |
| 5 | 54.684 | 1.86 | | |
| 6 (Stop) | ∞ | 4.61 | | |
| 7 | −9.114 | 0.80 | 1.75211 | 25.05 |
| 8 | 160.635 | 5.01 | 1.72916 | 54.68 |
| 9 | −10.437 | 0.13 | | |
| 10 (Aspheric Surface) | 24.999 | 2.80 | 1.53071 | 55.67 |
| 11 (Aspheric Surface) | −25.191 | D11 | | |
| 12 | 44.007 | 1.00 | 1.59270 | 35.31 |
| 13 | 28.619 | D13 | | |
| 14 | ∞ | 4.05 | 1.51633 | 64.14 |
| 15 | ∞ | 1.99 | | |
| Image Plane | ∞ | | | |

Aspheric Data

10th Surface

K = −0.004, A4 = −4.79269E−05, A6 = 1.82002E−07,
A8 = −4.99154E−10
11th Surface

K = −0.001, A4 = 1.06430E−05, A6 = 9.89060E−08

Focusing Data

| | Upon Focusing on Infinity | Upon Close-Range Focusing (Object Distance: 200 mm) |
|---|---|---|
| D11 | 1.83 | 11.25 |
| D13 | 14.32 | 4.90 |

Data Set

Upon Focusing on Infinity

| | |
|---|---|
| f | 17.35 |
| Fno | 2.89 |
| Angle of View(2ω) | 70.21° |
| Image Height | 11.15 |
| $BF_{inair}$ | 18.98 |
| Full Lens Length | 43.92 |

Numeral Example 4

Unit mm

Surface Data

| Surface No. | r | d | nd | νd |
|---|---|---|---|---|
| 1 | 17.840 | 0.56 | 1.48749 | 70.23 |
| 2 | 7.430 | 1.88 | | |
| 3 | 18.522 | 2.10 | 1.83400 | 37.16 |
| 4 | −22.398 | 0.86 | 1.56732 | 53.00 |
| 5 | 22.062 | 1.84 | | |
| 6 (Stop) | ∞ | 3.90 | | |
| 7 | −12.226 | 1.64 | 1.75265 | 26.50 |
| 8 | 20.027 | 5.42 | 1.72669 | 54.70 |
| 9 | −11.180 | 0.15 | | |
| 10 (Aspheric Surface) | 37.205 | 2.23 | 1.74320 | 49.34 |
| 11 (Aspheric Surface) | −38.408 | D11 | | |
| 12 (Aspheric Surface) | −82.000 | 1.00 | 1.53071 | 55.67 |
| 13 (Aspheric Surface) | 168.000 | D13 | | |
| 14 | ∞ | 4.05 | 1.51633 | 64.14 |
| 15 | ∞ | 2.04 | | |
| Image Plane | ∞ | | | |

Aspheric Data

10th Surface

K = −8.323, A4 = 1.43803E−05, A6 = 2.70208E−08,
A8 = −1.15996E−09
11th Surface

K = 9.024, A4 = 3.74844E−05, A6 = −5.71708E−10,
A8 = −4.43968E−11
12th Surface

K = −2.677, A4 = 1.02373E−05, A6 = −6.51161E−08,
A8 = 4.34427E−10
13th Surface

K = −1.407, A4 = 7.77734E−07, A6 = 7.60175E−08

Focusing Data

| | Upon Focusing on Infinity | Upon Close-Range Focusing (Object Distance: 200 mm) |
|---|---|---|
| D11 | 1.80 | 6.87 |
| D13 | 14.86 | 9.79 |

Data Set

Upon Focusing on Infinity

| | |
|---|---|
| f | 17.40 |
| Fno | 2.89 |
| Angle of View(2ω) | 71.18° |
| Image Height | 11.15 |
| $BF_{inair}$ | 19.57 |
| Full Lens Length | 42.95 |

Numeral Example 5

Unit mm

Surface Data

| Surface No. | r | d | nd | νd |
|---|---|---|---|---|
| 1 | 51.326 | 1.22 | 1.49700 | 81.54 |
| 2 | 8.402 | 2.38 | | |

-continued

Unit mm

| | | | | |
|---|---|---|---|---|
| 3 | 26.336 | 2.35 | 1.83400 | 37.16 |
| 4 | −59.578 | 1.59 | | |
| 5 | ∞ | 4.10 | | |
| 6 (Stop) | −9.632 | 0.92 | 1.75211 | 25.05 |
| 7 | 122.226 | 5.43 | 1.72916 | 54.68 |
| 8 | −10.321 | 0.17 | | |
| 9 (Aspheric Surface) | 26.719 | 2.40 | 1.58313 | 59.38 |
| 10 (Aspheric Surface) | −27.532 | D10 | | |
| 11 | −102.167 | 1.00 | 1.64769 | 33.79 |
| 12 | 115.625 | D12 | | |
| 13 | ∞ | 4.05 | 1.51633 | 64.14 |
| 14 | ∞ | 2.05 | | |
| Image Plane | ∞ | | | |

Aspheric Data

9th Surface

K = −0.22, A4 = −4.00875E−05, A6 = 5.77805E−08, A8 = −4.43437E−10

10th Surface

K = −0.010, A4 = 1.11310E−05, A6 = 6.69425E−10

Focusing Data

| | Upon Focusing on Infinity | Upon Close-Range Focusing (Object Distance: 200 mm) |
|---|---|---|
| D10 | 2.29 | 5.88 |
| D12 | 13.86 | 10.28 |

Data Set

Upon Focusing on Infinity

| | |
|---|---|
| f | 16.27 |
| Fno | 2.89 |
| Angle of View(2ω) | 75.99° |
| Image Height | 11.15 |
| BF$_{inair}$ | 18.58 |
| Full Lens Length | 42.44 |

Numeral Example 6

Unit mm

Surface Data

| Surface No. | r | d | nd | vd |
|---|---|---|---|---|
| 1 (Aspheric Surface) | 26.460 | 0.95 | 1.53071 | 55.67 |
| 2 (Aspheric Surface) | 8.762 | 1.40 | | |
| 3 | 27.091 | 2.48 | 1.83400 | 37.16 |
| 4 | −27.931 | 0.68 | 1.48749 | 70.23 |
| 5 | 100.800 | 1.82 | | |
| 6 (Stop) | ∞ | 4.42 | | |
| 7 | −13.489 | 0.82 | 1.84000 | 24.00 |
| 8 | 162.565 | 0.59 | | |
| 9 | −250.212 | 5.13 | 1.74100 | 52.64 |
| 10 | −10.790 | 0.51 | | |
| 11 (Aspheric Surface) | 31.744 | 4.62 | 1.74320 | 49.34 |
| 12 (Aspheric Surface) | −37.928 | D12 | | |
| 13 | −238.328 | 1.00 | 1.51633 | 64.14 |
| 14 | −55.574 | 1.68 | 1.76182 | 26.52 |
| 15 | 68.111 | D15 | | |
| 16 | ∞ | 4.05 | 1.51633 | 64.14 |
| 17 | ∞ | 2.07 | | |
| Image Plane | ∞ | | | |

-continued

Unit mm

Aspheric Data

1st Surface

K = 1.159, A4 = 4.56502E−05, A6 = −1.39874E−09, A8 = 2.74264E−11

2nd Surface

K = 0.273, A4 = 3.93049E−05, A6 = 1.98347E−10, A8 = −2.83272E−10

11th Surface

K = −0.010, A4 = −2.82264E−05, A6 = 9.40616E−10, A8 = 2.10448E−09

12th Surface

K = 0.382, A4 = −7.58543E−06, A6 = −1.43213E−07, A8 = 3.02164E−09

Focusing Data

| | Upon Focusing on Infinity | Upon Close-Range Focusing (Object Distance: 200 mm) |
|---|---|---|
| D12 | 1.40 | 4.36 |
| D15 | 13.38 | 10.42 |

Data Set

Upon Focusing on Infinity

| | |
|---|---|
| f | 18.35 |
| Fno | 2.89 |
| Angle of View(2ω) | 67.50° |
| Image Height | 11.15 |
| BF$_{inair}$ | 18.12 |
| Full Lens Length | 45.63 |

Numeral Example 7

Unit mm

Surface Data

| Surface No. | r | d | nd | vd |
|---|---|---|---|---|
| 1 (Aspheric Surface) | 29.856 | 0.95 | 1.53071 | 55.67 |
| 2 (Aspheric Surface) | 7.695 | 1.38 | | |
| 3 | 25.972 | 2.51 | 1.83400 | 37.16 |
| 4 | −23.010 | 0.69 | 1.48749 | 70.23 |
| 5 | 87.649 | 1.82 | | |
| 6 (Stop) | ∞ | 4.13 | | |
| 7 | −10.936 | 0.88 | 1.75211 | 25.05 |
| 8 | 37.206 | 5.07 | 1.74100 | 52.64 |
| 9 | −10.225 | 0.12 | | |
| 10 (Aspheric Surface) | 32.122 | 3.65 | 1.53071 | 55.67 |
| 11 (Aspheric Surface) | −28.137 | D11 | | |
| 12 | −192.861 | 1.00 | 1.74077 | 27.79 |
| 13 | 308.172 | D13 | | |
| 14 | ∞ | 4.05 | 1.51633 | 64.14 |
| 15 | ∞ | 2.07 | | |
| Image Plane | ∞ | | | |

Aspheric Data

1st Surface

K = −0.149, A4 = −4.30218E−07, A6 = −1.91070E−09, A8 = −1.12997E−08

-continued

Unit mm

2nd Surface

K = −0.000, A4 = −1.09661E−07, A6 = 1.92319E−06,
A8 = −1.45954E−07
10th Surface

K = −0.009, A4 = −3.20893E−05, A6 = 2.74308E−08,
A8 = 3.01212E−11
11th Surface

K = −0.007, A4 = 6.07754E−06, A6 = −3.48783E−08,
A8 = 6.28869E−10

Focusing Data

| Upon Focusing on Infinity | Upon Close-Range Focusing (Object Distance: 200 mm) |
|---|---|
| D11 | 1.41 | 9.88 |
| D13 | 15.34 | 6.87 |

Data Set

| | Upon Focusing on Infinity |
|---|---|
| f | 17.10 |
| Fno | 2.89 |
| Angle of View(2ω) | 72.16° |
| Image Height | 11.15 |
| $BF_{inair}$ | 20.08 |
| Full Lens Length | 43.70 |

Numeral Example 8

Unit mm

Surface Data

| Surface No. | r | d | nd | vd |
|---|---|---|---|---|
| 1 (Aspheric Surface) | 125.562 | 0.95 | 1.53071 | 55.67 |
| 2 (Aspheric Surface) | 6.900 | 1.38 | | |
| 3 | 20.818 | 2.17 | 1.83400 | 37.16 |
| 4 | −20.572 | 0.67 | 1.48749 | 70.23 |
| 5 | 96.761 | 1.82 | | |
| 6 (Stop) | ∞ | 5.19 | | |
| 7 | −13.489 | 0.82 | 1.75211 | 25.05 |
| 8 | 36.390 | 4.58 | 1.74100 | 52.64 |
| 9 | −10.497 | 0.12 | | |
| 10 (Aspheric Surface) | 25.598 | 3.82 | 1.53071 | 55.67 |
| 11 (Aspheric Surface) | −24.390 | D11 | | |
| 12 | −110.170 | 1.00 | 1.74077 | 27.79 |
| 13 | 187.683 | D13 | | |
| 14 | ∞ | 4.05 | 1.51633 | 64.14 |
| 15 | ∞ | 2.07 | | |
| Image Plane | ∞ | | | |

Aspheric Data

1st Surface

K = −2.536, A4 = −1.09261E−05, A6 = −5.89657E−09,
A8 = 1.13666E−12
2nd Surface

K = −0.166, A4 = −2.61853E−05, A6 = −2.16439E−06,
A8 = −2.45117E−08
10th Surface

K = −0.005, A4 = −2.11108E−05, A6 = 2.61003E−08,
A8 = 4.76609E−10

-continued

Unit mm

11th Surface

K = −0.022, A4 = 3.54665E−05, A6 = −7.17246E−08,
A8 = 1.26379E−09

Focusing Data

| Upon Focusing on Infinity | Upon Close-Range Focusing (Object Distance: 200 mm) |
|---|---|
| D11 | 1.44 | 4.83 |
| D13 | 12.76 | 9.37 |

Data Set

| | Upon Focusing on Infinity |
|---|---|
| f | 14.46 |
| Fno | 2.89 |
| Angle of View(2ω) | 85.47° |
| Image Height | 11.15 |
| $BF_{inair}$ | 17.50 |
| Full Lens Length | 41.45 |

Numeral Example 9

Unit mm

Surface Data

| Surface No. | r | d | nd | vd |
|---|---|---|---|---|
| 1 (Aspheric Surface) | 64.053 | 2.00 | 1.53071 | 55.67 |
| 2 | 171.562 | 0.70 | | |
| 3 | −183.020 | 0.70 | 1.48749 | 70.23 |
| 4 | 11.398 | 4.16 | | |
| 5 | 23.950 | 1.86 | 1.83400 | 37.16 |
| 6 | −79.853 | 1.05 | | |
| 7 (Stop) | ∞ | 4.71 | | |
| 8 | −9.271 | 1.41 | 1.75211 | 25.05 |
| 9 | −80.000 | 5.59 | 1.72916 | 54.68 |
| 10 | −11.558 | 0.17 | | |
| 11 (Aspheric Surface) | 29.822 | 2.70 | 1.58313 | 59.38 |
| 12 (Aspheric Surface) | −26.108 | D12 | | |
| 13 | −322.510 | 1.00 | 1.84666 | 23.78 |
| 14 | 87.000 | D14 | | |
| 15 | ∞ | 4.05 | 1.51633 | 64.14 |
| 16 | ∞ | 2.06 | | |
| Image Plane | ∞ | | | |

Aspheric Data

1st Surface

K = 16.282, A4 = 4.47970E−08, A6 = −4.18587E−08
11th Surface

K = −0.143, A4 = −2.55896E−05, A6 = 6.06481E−08,
A8 = −4.60179E−10
12th Surface

K = −1.287, A4 = 1.85888E−05, A6 = 1.68780E−09

Focusing Data

| Upon Focusing on Infinity | Upon Close-Range Focusing (Object Distance: 200 mm) |
|---|---|
| D12 | 2.49 | 6.63 |
| D14 | 15.38 | 11.24 |

-continued

| Unit mm | |
|---|---|
| Data Set | |
| Upon Focusing on Infinity | |
| f | 18.26 |
| Fno | 2.89 |
| Angle of View(2ω) | 68.17° |
| Image Height | 11.15 |
| $BF_{inair}$ | 20.11 |
| Full Lens Length | 48.66 |

Numeral Example 10

| Unit mm | | | | |
|---|---|---|---|---|
| Surface Data | | | | |
| Surface No. | r | d | nd | vd |
| 1 | 28.199 | 2.18 | 1.85026 | 32.27 |
| 2 | −50.692 | 1.13 | 1.56732 | 42.82 |
| 3 | 28.622 | 1.56 | | |
| 4 (Stop) | ∞ | 4.02 | | |
| 5 | −8.340 | 0.87 | 1.75211 | 25.05 |
| 6 | 96.685 | 5.44 | 1.73400 | 51.47 |
| 7 | −11.041 | 0.25 | | |
| 8 (Aspheric Surface) | 32.720 | 2.99 | 1.74320 | 49.34 |
| 9 (Aspheric Surface) | −40.176 | D9 | | |
| 10 | −200.425 | 1.00 | 1.49700 | 81.54 |
| 11 | 41.724 | D11 | | |
| 12 | ∞ | 4.05 | 1.51633 | 64.14 |
| 13 | ∞ | 2.05 | | |
| Image Plane | ∞ | | | |

Aspheric Data

8th Surface

K = −0.173, A4 = −2.66631E−05, A6 = 8.53561E−08,
A8 = −2.52417E−10

9th Surface

K = −0.169, A4 = 1.38528E−07, A6 = 2.04712E−09

Focusing Data

| | Upon Focusing on Infinity | Upon Close-Range Focusing (Object Distance: 200 mm) |
|---|---|---|
| D11 | 5.40 | 11.81 |
| D13 | 10.66 | 4.25 |

| Data Set | |
|---|---|
| Upon Focusing on Infinity | |
| f | 22.85 |
| Fno | 2.89 |
| Angle of View(2ω) | 54.41° |
| Image Height | 11.15 |
| $BF_{inair}$ | 15.38 |
| Full Lens Length | 40.23 |

FIGS. 12 to 21 are sets of aberration diagrams (a) in the focusing-on-infinity state and (b) upon close-range focusing for various aberrations of Examples 1 to 10. Given to spherical aberrations and chromatic aberration of magnification are numeral values at the respective wavelengths of 587.6 nm (d-line: a solid line), and 435.8 nm (g-line: a one-dotted chain line), 656.3 nm (C-line: a broke line). Astigmatism is shown with the sagittal image plane as a solid line and the meridional image plane as a dotted line. Note here that FNO is the F-number, and ω is the half angle of view.

Tabulated below are the values of Conditions (1) to (6) in the examples.

| Condition | Example 1 | Example 2 | Example 3 | Example 4 | Example 5 |
|---|---|---|---|---|---|
| (1) | 0.13 | 0.01 | 0.08 | 0.07 | 0.03 |
| (2) | 0.27 | 2.18 | −4.72 | 0.34 | 0.06 |
| (3) | −4.29 | −9.85 | −8.16 | −5.96 | −5.14 |
| (4) | 0.19 | 0.17 | 0.18 | 0.18 | 0.17 |
| (5) | 0.36 | 0.18 | 0.11 | 0.28 | 0.19 |
| (6) | 0.03 | 0.01 | 0.04 | 0.04 | 0.05 |

| Condition | Example 6 | Example 7 | Example 8 | Example 9 | Example 10 |
|---|---|---|---|---|---|
| (1) | 0.01 | 0.11 | 0.24 | 0.29 | 0.45 |
| (2) | 0.10 | 0.23 | 0.26 | −0.58 | −0.66 |
| (3) | −3.05 | −9.35 | −6.47 | −4.43 | −3.04 |
| (4) | 0.19 | 0.18 | 0.14 | 0.18 | 0.29 |
| (5) | 0.24 | 0.33 | 0.36 | 0.05 | 0.04 |
| (6) | 0.03 | 0.03 | 0.03 | 0.05 | 0.13 |

Figure 22:
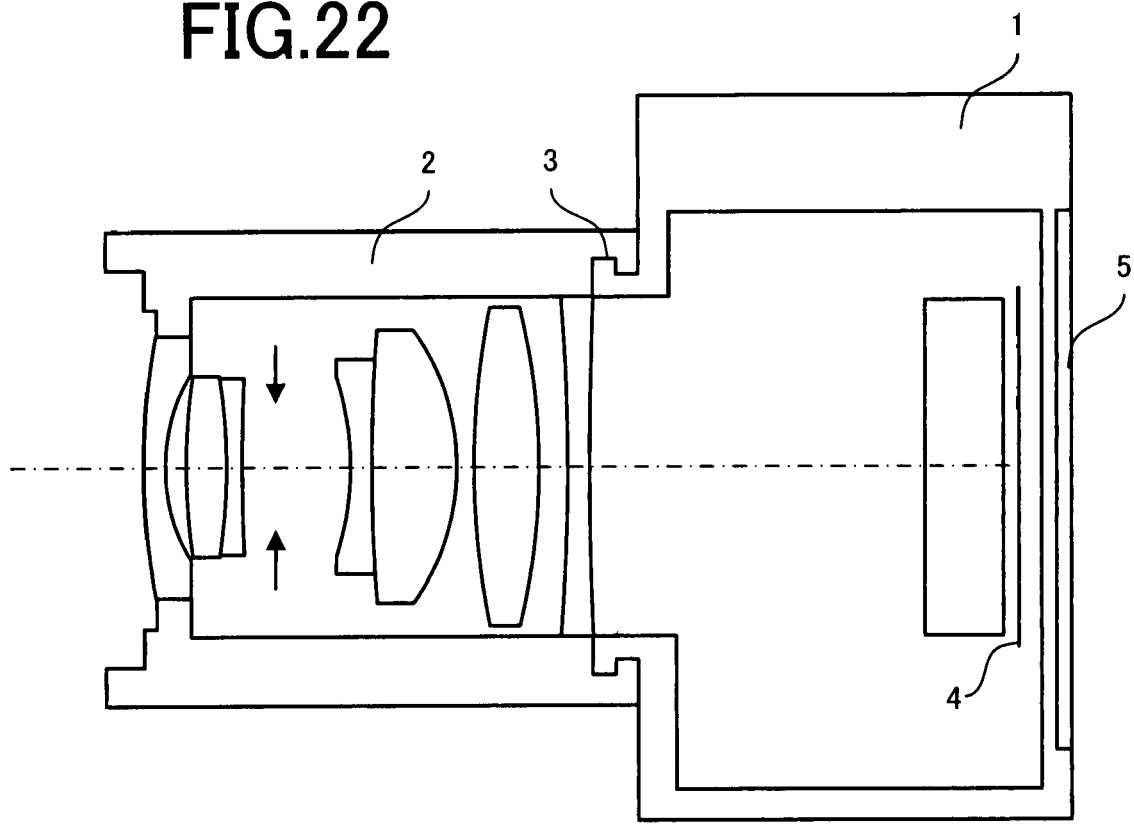
FIG. 22 is a sectional view of a lens interchangeable camera with the inventive wide-angle lens used as an interchangeable lens.

FIG. 22 is a sectional view of a single-lens reflex camera operating as an electronic imaging apparatus using the inventive wide-angle lens and employing typically a small-format CCD or CMOS as an imaging device. In FIG. 22, reference numeral 1 is the single-lens reflex camera, 2 is an image-taking lens system received in a lens barrel, 3 is a lens mount for making the image-taking lens system 2 attachable to or detachable from the single-lens reflex camera 1, for which a screw type or bayonet type mount is used. The bayonet type lens mount is herein used. Reference numerals 4 and 5 are an imaging device plane and a back monitor, respectively.

The optical systems shown typically in Examples 1 to 10 are used for the image-taking lens 2 of the thus assembled single-lens reflex camera.

According to the inventive embodiment here, it is possible to provide a low-lenses-count, compact wide-angle optical system that is used as an interchangeable lens well fit for a single-lens type digital camera, is well corrected just only for various aberrations in general and chromatic aberrations and field curvature in particular but also for distortion to some extents, and makes sure the telecentric feature.

Figure 23:
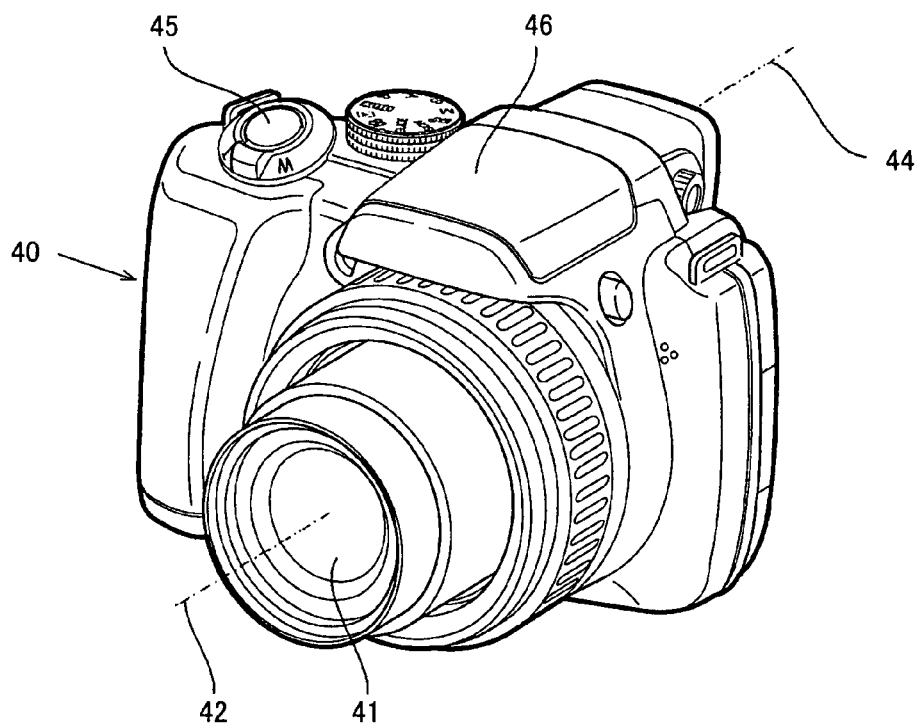
FIG. 23 is a front perspective view of the outside configuration of one exemplary digital camera according to the invention.
Figure 24:
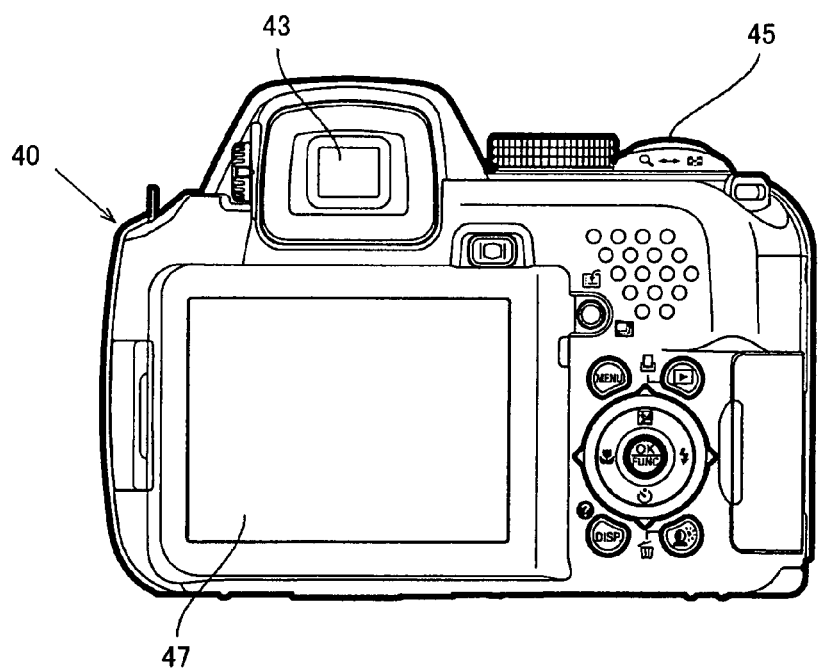
FIG. 24 is a rear view of the digital camera of FIG. 23.
Figure 25:
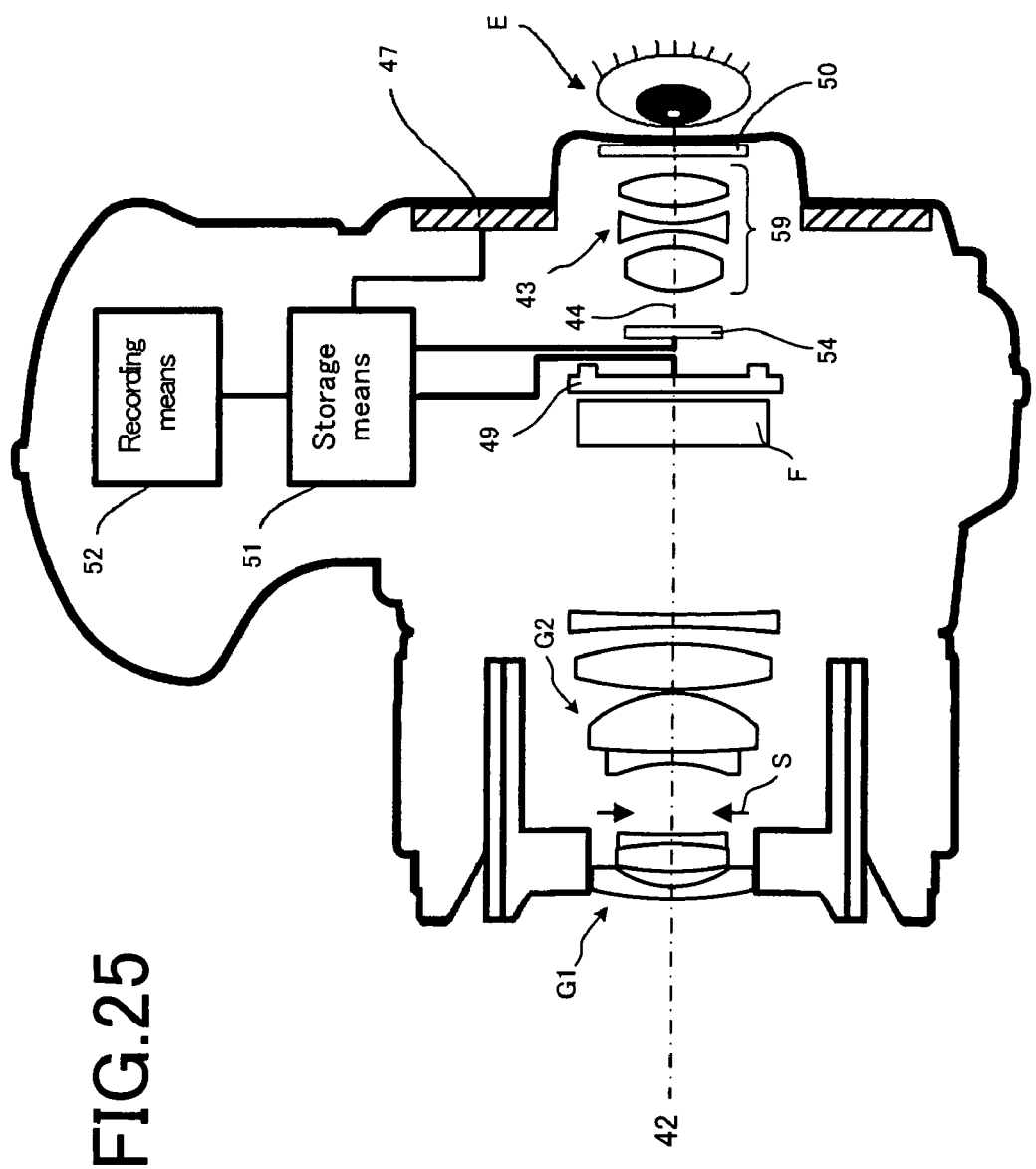
FIG. 25 is a cross-sectional view of the digital camera of FIG. 23.

FIGS. 23 to 26 are illustrative in conception of the arrangement of the inventive imaging apparatus having a lens built in an image-taking optical system 41. Specifically, FIG. 23 is a front perspective view of the outside configuration of a digital camera 40, FIG. 24 is a rear view of the same, and FIG. 25 is a schematic cross-sectional view of the arrangement of the digital camera 40.

The digital camera 40 here includes an image-taking optical system 41 positioned on an image-taking optical path 42, a finder optical system 43 positioned on a finder optical path 44, a shutter button 45, a popup strobe 46, a liquid crystal monitor 47, etc. As the shutter button 45 located on top of the camera 40 is pressed down, it causes images to be taken through the image-taking optical system 41, for instance, the optical system of Example 1. An object image formed by the image-taking optical system 41 is then formed on the imaging plane (photoelectric transformation plane) of an imaging device CCD 49 located near the imaging plane via a filter F. The object image received at that CCD 49 is displayed as an electronic image on the liquid crystal display monitor 47 on the back side of the camera or a finder image display device 54 via a processing means 51. The processing means 51 is connected with a recording means 52 for recording taken images in it.

It is here noted that the recording means 52 may be provided separately of the processing means 51 or, alternatively, images may be electronically written and recorded in flexible disks, memory cards, MOs or the like. If silver halide film is loaded in place of CCD 49, there may then be a silver halide film camera set up.

In addition, there is a finder eyepiece lens 59 located on the finder optical path 44. An object image displayed on the finder image display device 54 is enlarged and adjusted to an easy-to-look diopter by that finder eyepiece lens 59 before it is guided to the viewer's eyeball E. Note here that there is a cover member 50 located on the exit side of the finder eyepiece lens 59.

Figure 26:
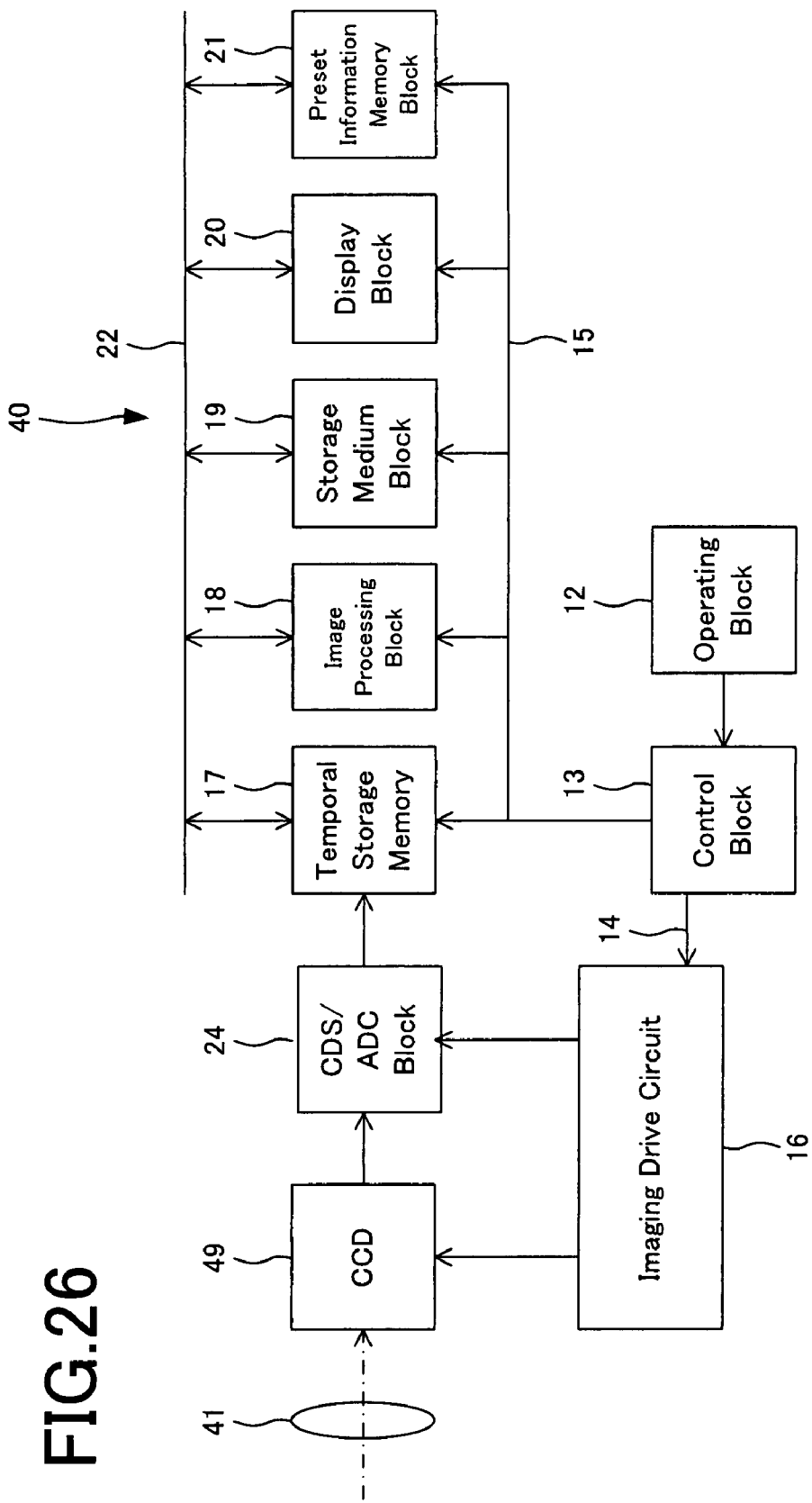
FIG. 26 is a block diagram for the internal circuitry in the main part of the digital camera depicted in FIG. 23.

FIG. 26 is a block diagram for the makeup of the internal circuitry in a main part of the digital camera 40. As described just below, the processing means 51 typically includes a CDS/ADC block 24, a temporary storage memory 17, an image processing block 18, etc., and the recording means 52 includes a storage medium block 19, etc.

As shown in FIG. 26, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the inventive optical system 41. More specifically, the CCD 49 is an imaging device that is driven and controlled by a taking drive circuit 16, and converts light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing including distortion correction based on an image quality parameter instructed by the control block 13.

The storage medium block 19 is a control circuit for a device that detachably receives a card type or stick type recording medium comprising typically a flash memory so that the RAW data transferred from the temporal memory 17 or image data processed at the image processing block 18 are recorded and held in that card type or stick type recording medium.

The display block 20 is a circuit that includes the liquid crystal display monitor 47 and finder image display device 54 to display images, operating menus or the like on them. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The thus assembled digital camera 40 can be provided as an imaging apparatus comprising a low-lenses-count, compact wide-angle optical system that is just only well corrected for various aberrations in general and chromatic aberrations and field curvature in particular, but is also corrected for distortion to some extents, and makes sure the telecentric feature.

Especially when the inventive imaging apparatus is used for the taking of moving images, there is a smooth response to AF at the time of taking moving images. In addition, that imaging apparatus are well corrected for various aberrations with a decrease in the weight of the focusing group.

The inventive imaging apparatus here, because of having a long back focus, also allows for a space wide enough for the insertion of the filter F or other optical elements just in front of the imaging plane.

The inventive imaging apparatus here may be applied not only to such so-called digital cameras for taking general subjects as described above, but also to surveillance cameras.

What is claimed is:

1. An optical system, comprising, in order from an object side thereof:
    a first lens group that remains fixed,
    an aperture stop,
    a second lens group that remains fixed and has positive refracting power, and
    a third lens group that includes one or a cemented, first lens, is movable and has negative refracting power, wherein:
    the third lens group moves along an optical axis toward an image side thereby implementing focusing from a focusing-on-infinity state to a focusing-on-a-near-distance state, with satisfaction of the following Conditions (1) and (2):

$$|f_{(2+3)g}/f_{1g}|<1 \qquad (1)$$

$$-6.0<(R_{3gr}+R_{3gf})/(R_{3gr}-R_{3gf})<3.5 \qquad (2)$$

where $f_{(2+3)g}$ is a combined focal length of the second lens group and the third lens group upon focusing on infinity,
    $f_{1g}$ is a focal length of the first lens group,
    $R_{3gr}$ is an axial radius of curvature of a surface in and on the most image side of a negative lens component forming a part of the third lens group, and
    $R_{3gf}$ is an axial radius of curvature of a surface in and on the most object side of the lens component forming a part of the third lens group.

2. The optical system according to claim 1, wherein the third lens group satisfies the following Condition (3):

$$-12<f_{3g}/f<-1.5 \qquad (3)$$

where $f_{3g}$ is a focal length of the third lens group, and
    f is a focal length of the whole optical system upon focusing on infinity.

3. The optical system according to claim 1, which satisfies the following Condition (4):

$$-0.1 < -h/exp < 0.4 \quad (4)$$

where exp is a distance from an exit pupil position to an image plane in an infinite state, provided that a direction from an object plane toward the image plane is taken as positive, and h is defined by a height on the image plane of a chief ray of rays incident at 27° on an optical axis (a half angle of view of incidence: 27°).

4. The optical system according to claim 1, wherein the second lens group comprises, in order from the object side, a second lens having negative refracting power, a third lens having positive refracting power, and a lens component having positive refracting power, with satisfaction of the following Condition (5):

$$|f_{2g}/f_i| < 0.6 \quad (5)$$

where $f_i$ is a combined focal length of the second lens group and the third lens group, and $f_{2g}$ is a focal length of the second lens group.

5. The optical system according to claim 1, which satisfies the following Condition (6):

$$0.005 < D_{2g\text{-}3g}/TL < 0.2 \quad (6)$$

where $d_{2g\text{-}3g}$ is an axial separation, upon focusing on infinity, between a surface in and on the most image side of the second lens group and a surface in and on the most object side of the third lens group, and TL is a full length of the optical system.

* * * * *